United States Patent
Yoshino et al.

(10) Patent No.: US 6,204,933 B1
(45) Date of Patent: Mar. 20, 2001

(54) INFORMATION PRINT SYSTEM AND IMAGE PROCESSING APPARATUS

(75) Inventors: Eiji Yoshino; Hitoshi Tamura; Akira Sasaki; Hiroyuki Tadokoro, all of Hitachi; Nobuo Suzuki, Hitachinaka; Tatsuki Inuzuka; Atsushi Onose, both of Hitachi; Tatsunari Satoo, Tsuchiura; Takeshi Shibuya, Shimoinayoshi; Tadashi Okada, Hadano; Masayuki Kanda, Hadano; Naoyuki Urata, Hadano, all of (JP)

(73) Assignees: Hitachi, Ltd., Tokyo; Hitachi Information Technology Co., Ltd., Kanagawa, both of (JP)

( * ) Notice: Subject to any disclaimer, the term of this patent is extended or adjusted under 35 U.S.C. 154(b) by 0 days.

(21) Appl. No.: 09/095,889

(22) Filed: Jun. 11, 1998

(30) Foreign Application Priority Data

Jun. 20, 1997 (JP) .................................................. 9-163713
Sep. 19, 1997 (JP) .................................................. 9-254824

(51) Int. Cl.⁷ ...................................................... H04N 1/41
(52) U.S. Cl. ........................... 358/1.9; 358/426; 358/429; 358/534; 382/232; 382/235

(58) Field of Search .............................. 395/109; 382/232, 382/233, 235, 239, 244, 245, 246, 296, 297; 358/426, 261.1, 261.2, 427, 429, 430, 534, 539, 1.9

(56) References Cited

U.S. PATENT DOCUMENTS 5,768,489 * 6/1998 Adachi et al. ....................... 395/117
5,867,612 * 2/1999 Robson ................................ 382/298
5,930,466 * 7/1999 Rademacher ........................ 395/114

* cited by examiner

*Primary Examiner*—Thomas D. Lee
(74) *Attorney, Agent, or Firm*—Antonelli, Terry, Stout & Kraus, LLP

(57) ABSTRACT

A personal computer has a print image developing means and a data compression means including a fixed rate compression. A color printer has a data extension means, a color correction means, a gamma correction means, a first halftoning means, an image area segmentation means, and a second halftoning means. The transmission time of a print image can be shortened necessarily to less than a constant time, and further, since an enormous memory for extension is unnecessary, a low cost printer can be provided.

22 Claims, 26 Drawing Sheets

FIG.4
(A)
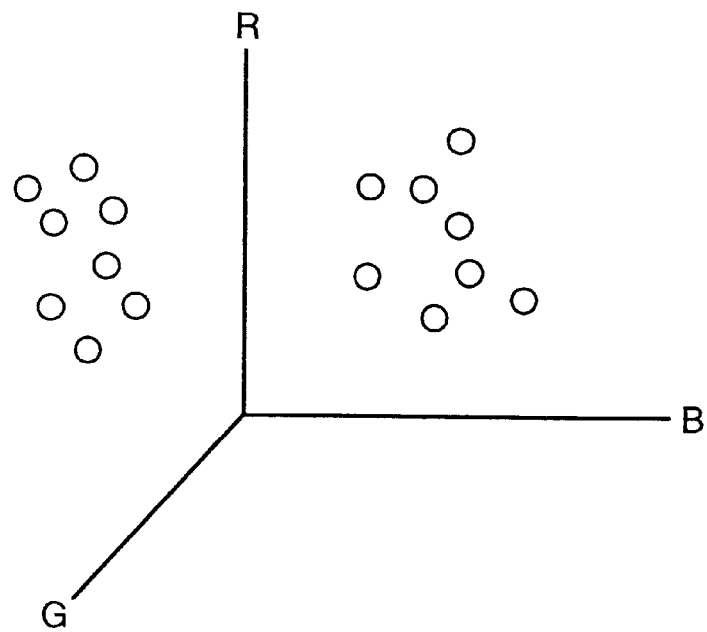
(B)
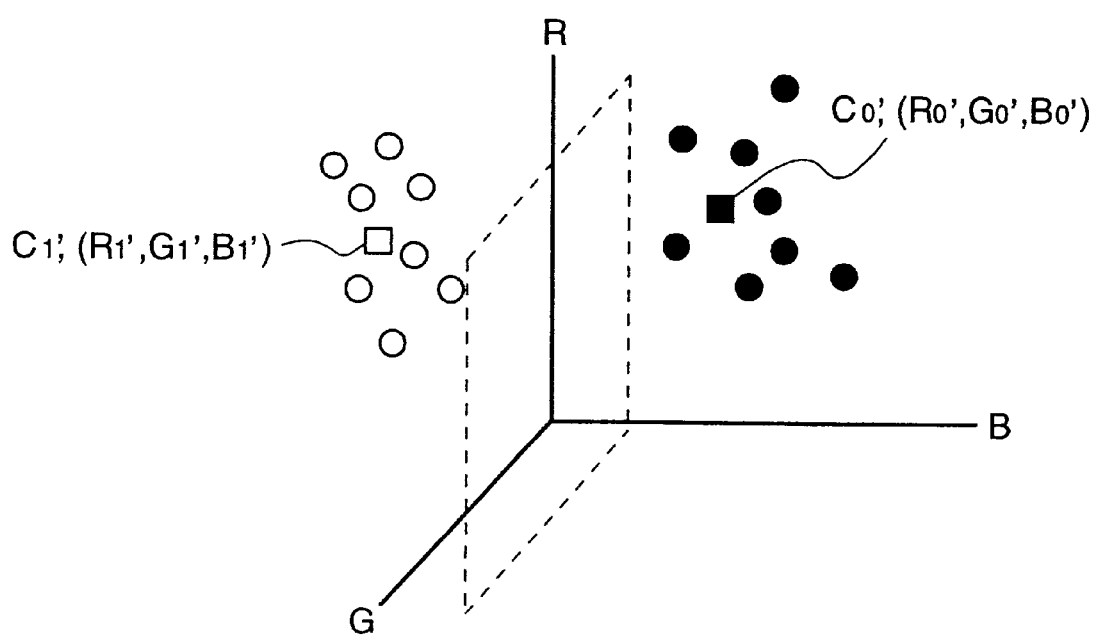

ORIGINAL DATA

| $C_0$ | $C_1$ | $C_2$ | $C_3$ |
|---|---|---|---|
| $C_4$ | $C_5$ | $C_6$ | $C_7$ |
| $C_8$ | $C_9$ | $C_{10}$ | $C_{11}$ |
| $C_{12}$ | $C_{13}$ | $C_{14}$ | $C_{15}$ |

→

TWO COLORS BLOCK APPROXIMATION DATA

| $C_0'$ | $C_0'$ | $C_0'$ | $C_1'$ |
|---|---|---|---|
| $C_0'$ | $C_1'$ | $C_1'$ | $C_1'$ |
| $C_1'$ | $C_0'$ | $C_1'$ | $C_1'$ |
| $C_0'$ | $C_1'$ | $C_1'$ | $C_1'$ |

(B)

$C_0$: $R_0$ $G_0$ $B_0$ | $C_1$: $R_1$ $G_1$ $B_1$ | ----- | $C_{15}$: $R_{15}$ $G_{15}$ $B_{15}$   ORIGINAL DATA (48 BITES)

↓

$C_0'$: $R_0'$ $G_0'$ $B_0'$ | $C_1'$: $R_1'$ $G_1'$ $B_1'$ | SELECTION INFORMATION

TWO COLORS BLOCK APPROXIMATION COMPRESSION DATA (8 BITES)

| 0 | 0 | 0 | 1 | 0 | 1 | 1 | 0 | 1 | 0 | 1 | 1 | 0 | 1 | 1 | 0 | (4×4 PIXEL PART)

1 BIT (C)

$C_0$: $R_0$ $G_0$ $B_0$ | $C_1$: $R_1$ $G_1$ $B_1$ | ----- | $C_{63}$: $R_{63}$ $G_{63}$ $B_{63}$   ORIGINAL DATA (192 BITES)

↓ SELECTION INFORMATION (8×8 PIXEL PART)

$C_0'$: $R_0'$ $G_0'$ $B_0'$ | $C_1'$: $R_1'$ $G_1'$ $B_1'$ |

TWO COLORS BLOCK APPROXIMATION COMPRESSION DATA (14 BITES)

FIG.8
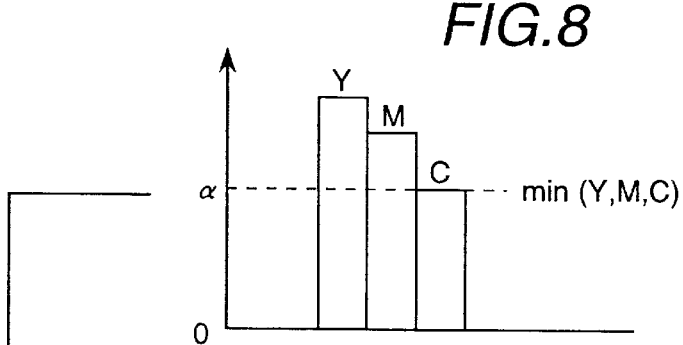
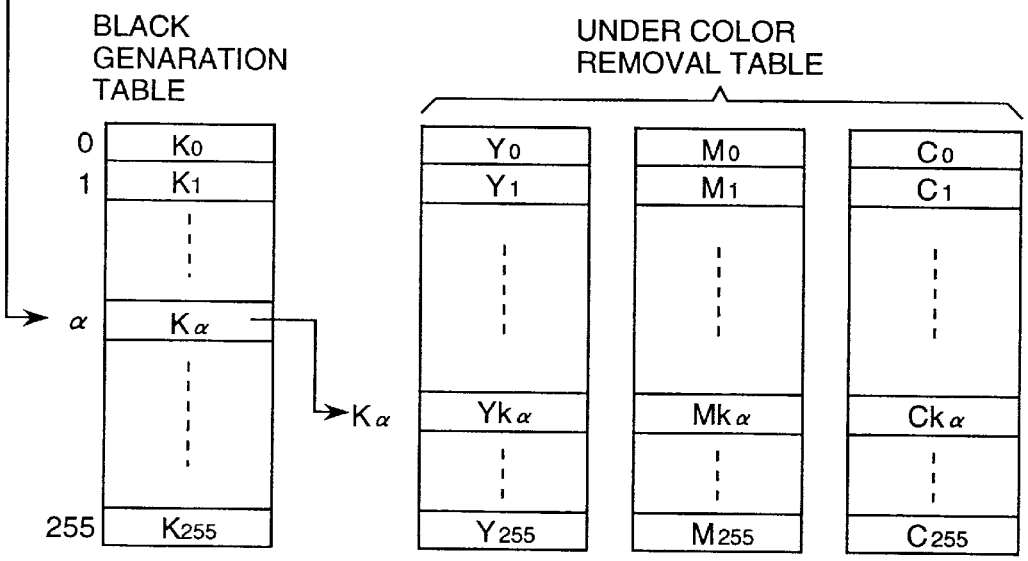
BLACK GENARATION TABLE
UNDER COLOR REMOVAL TABLE
FIG.9
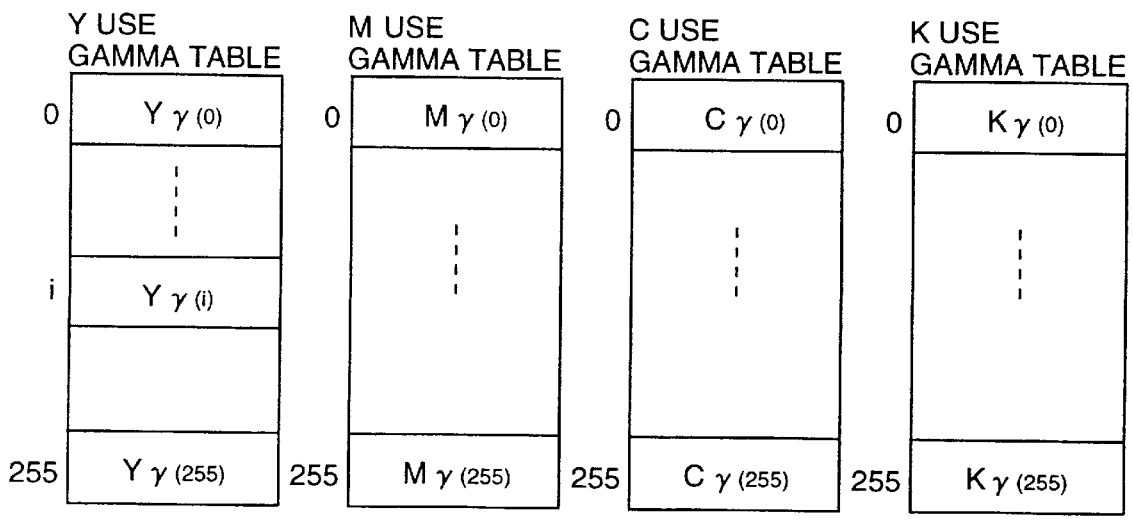
Y USE GAMMA TABLE   M USE GAMMA TABLE   C USE GAMMA TABLE   K USE GAMMA TABLE

FIG.33
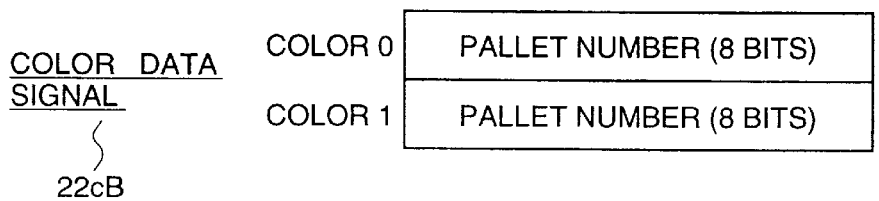
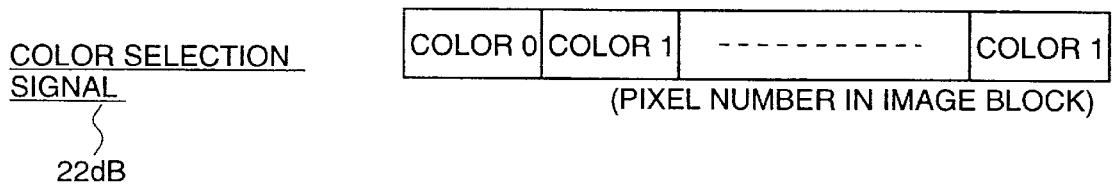
FIG.34
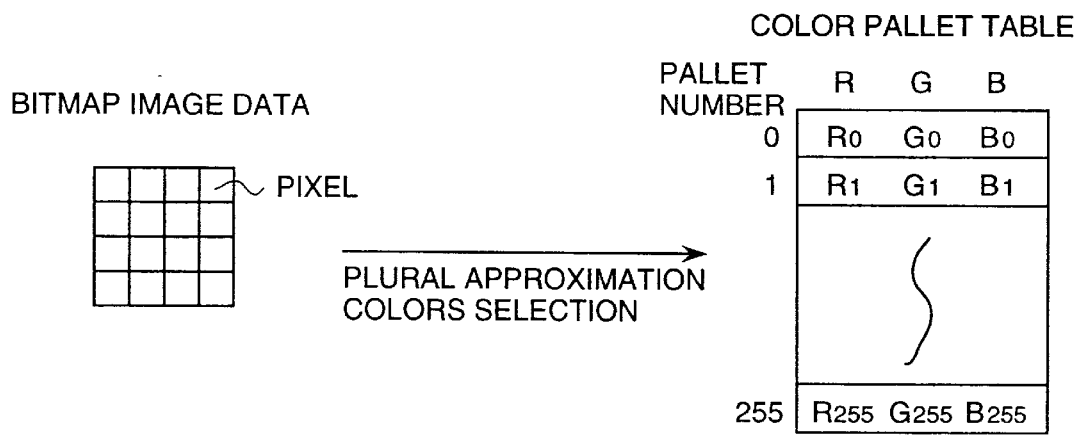

FIG.36
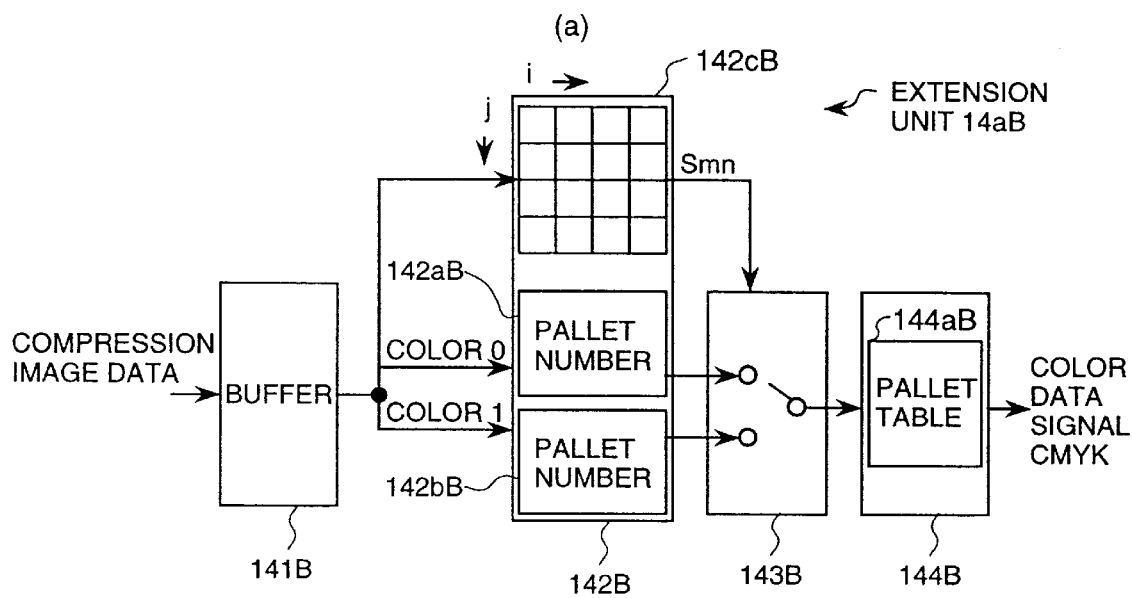
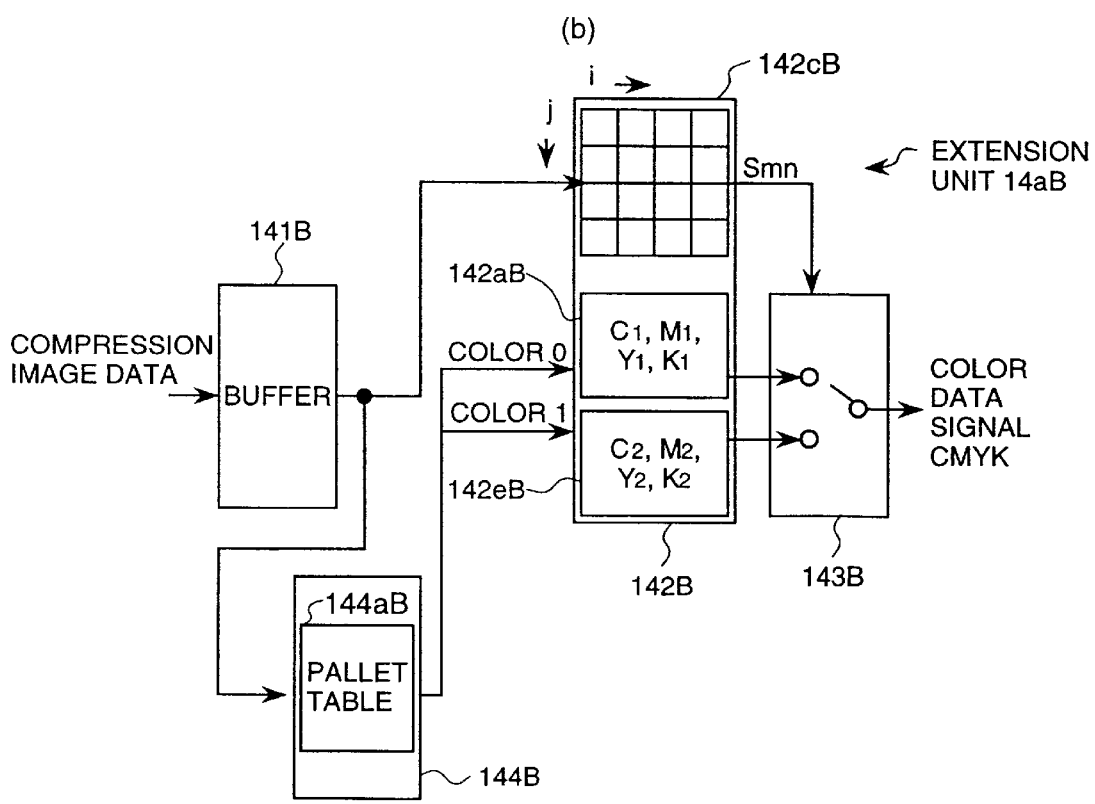

INFORMATION PRINT SYSTEM AND IMAGE PROCESSING APPARATUS

BACKGROUND OF THE INVENTION

The present invention relates to an information print system and an image processing apparatus wherein in an information process equipment such as a personal computer a data for carrying out a print is processed to make electronically and in a print equipment or an image outputting apparatus such as a printer under a basis of an obtained electronically data a print is carried out on a print recording paper etc.

In a prior art, as a printer for printing a data which is processed in a personal computer etc., there are various kinds of printers and in which so as to carry out a high speed and a high quality print, a laser printer is most suited. And recently, in place of the monochrome printers, much color laser printers are manufactured and a demand for the color laser printers increases remarkably.

However, in the color laser printer, in generally PDL (a page description language) using a general use interface is employed, at a side of a printer, there is a problem in which a construction of a print control unit for carrying out a data control becomes complicated one and also becomes high in a cost aspect.

Therefore, it is attempted that a printed data is described at a side of the personal computer and this described data is sent to a side of a printer, as a result a low cost information print system is realized. Since a commercial price of a printer engine can be reduced, the above stated information print system can be expected for a large demand in future.

However, in a method for sending the described data to the printer, a process reduction and a simplification of a control unit of the printer can be improved, there is a problem in which since a load at the side of the personal computer becomes large and also a transmission data becomes large, in comparison with PDL (the page description language), it will take a comparative large print time.

As stated in above, at the side of the personal computer, in the method for describing the print data and sending the described data, the burden for the personal computer is larger than in comparison with PDL (the page description language). However, since a performance of the recent personal computer is improved extremely remarkably, as a whole print system, a rate for occupying for a process time of the personal computer itself is lessened.

However, in the case of the color laser print, since an amount of a print image data for transmitting from the personal computer to the color laser printer is large, in the event of the improvement in performance for the personal computer, it can not reach to attain a large time shortening.

To attain the time shortening, there is a problem in which how a data transmission amount of the print image data for sending from the personal computer to the printer is made small, and to carry out a high quality print, it will be contrary to the above stated requirement in reduction of the data transmission amount.

SUMMARY OF THE INVENTION

An object of the present invention is to provide an information print system and an image processing apparatus wherein a transmission time of a print image data can be shortened and a print time can be shortened and a high quality print for suiting a printing characteristic of a printer can be obtained.

The essential features of the information print system and the image processing apparatus according to the present invention can be realized by providing a data compression means for compressing a transmission data at a side of an information equipment such as a personal computer and providing a data extension means for extending a compressed data at a print equipment and the data transmission between said information equipment and said print equipment is carried out giving and taking by said compressed data.

Further, with respect to the compression process and the extension process, by providing a fixed rate compression process and extension means and a variable rate compression process and extension means, and it can be realized according to a combination therebetween.

BRIEF DESCRIPTION OF DRAWINGS

FIG. 4 is a view showing a position on a color space of an approximation coding compression motion of a block;

FIG. 5 is a view showing a data style of an approximation coding compression motion of a block;

FIG. 8 is a view showing a conversion of a color conversion process;

FIG. 9 is a view showing a conversion of a gamma correction process;

FIG. 33 is a view for explaining a construction example of a compression image data in a case where a color in a predetermined image area truncated to plural colors using a color pallet table;

FIG. 34 is a view for explaining a generation process of a color data signal of a compressed image shown in FIG. 33;

FIG. 36 is a construction block view showing an extension unit 14aB shown in FIG. 35.

DESCRIPTION OF THE PRESENT INVENTION

Figure 1:
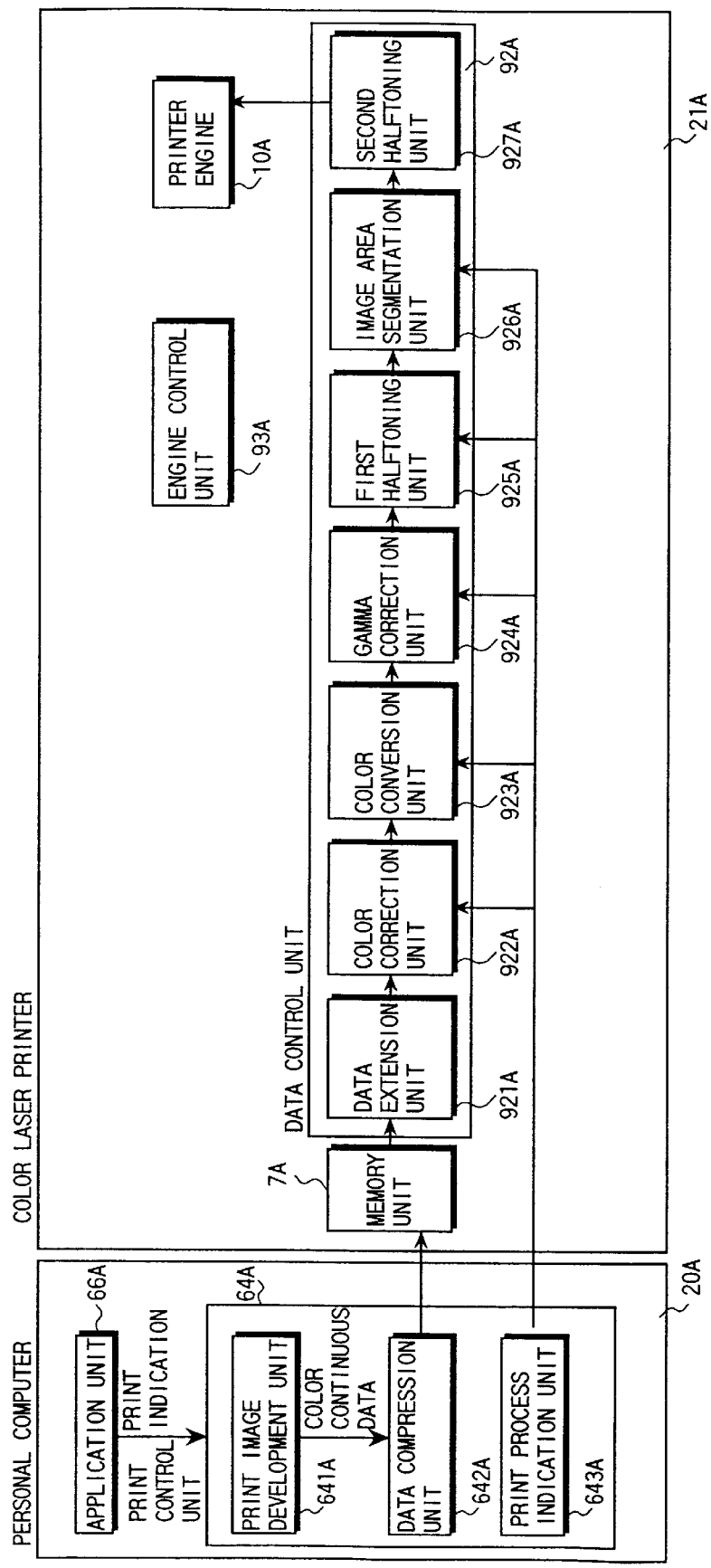
FIG. 1 is a view showing a concept of a whole print motion of an information print system and an image processing apparatus according to the present invention.

Hereinafter, one embodiment of an information print system and an image processing apparatus according to the present invention will be explained in detail referring to the drawings.

Figure 2:
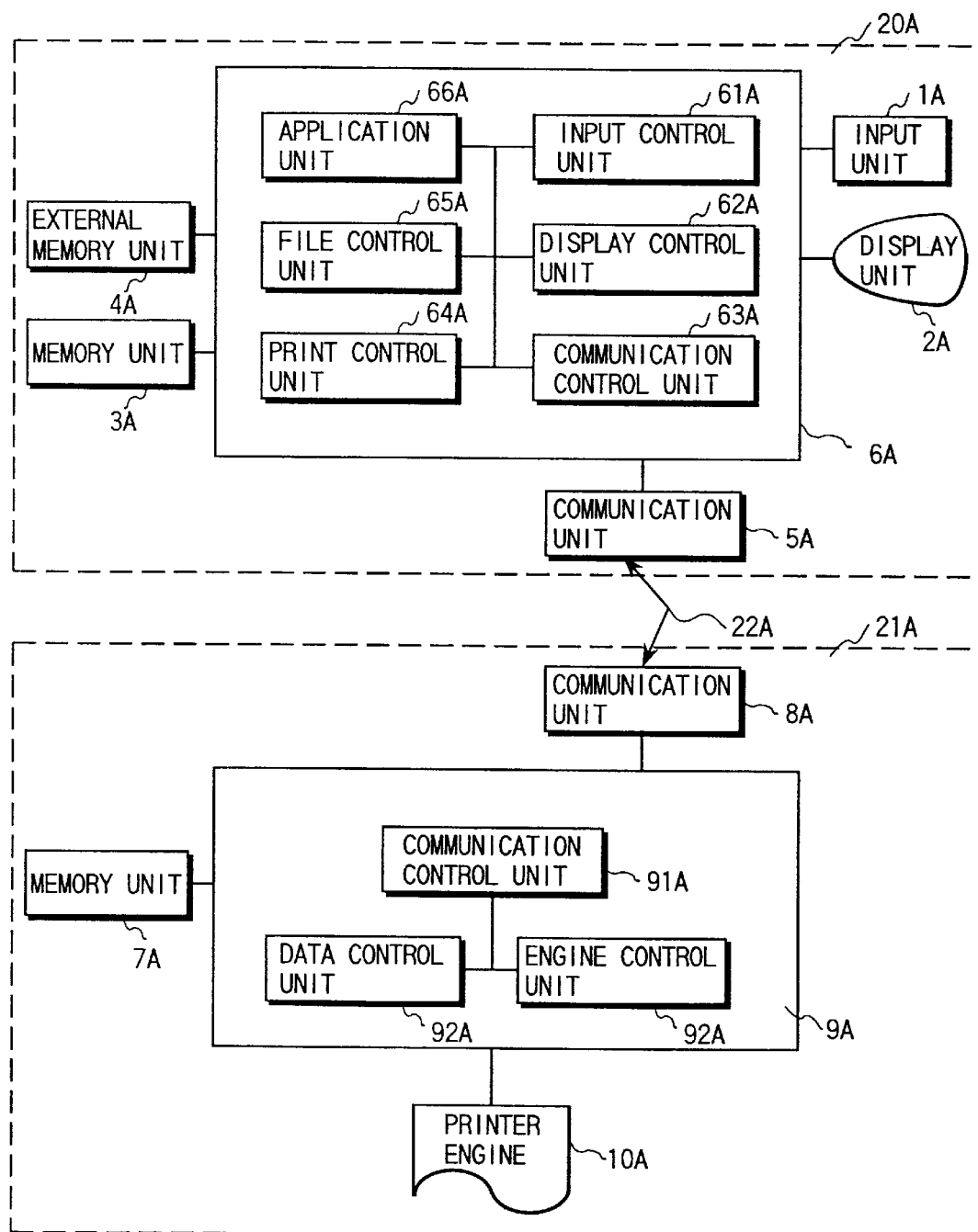
FIG. 2 is a view showing a whole construction of an information print system and an image processing apparatus according to the present invention.

In this embodiment of the information print system and the image processing apparatus according to the present invention, a personal computer is explained as an information processing equipment and a color laser printer will be explained as an outputting apparatus. First of all, the constructions of the personal computer and the color laser printer will be explained referring to FIG. 2.

A personal computer 20A is constituted by an input unit 1A such as a keyboard and a mouse, a display unit 2A such as a CRT for displaying a text and a graphics, a memory unit 3A such as a semiconductor memory for storing such as a data and a control program about a document, an external memory unit 4A such as a hard disc, a communication unit 5A such as a centronics for carrying out a communication with a color laser printer 21A, and a control unit 6A for carrying out various controls using a microprocessor etc. by various programs which have installed in an inside portion thereof.

The control unit 6A is constituted by an input control unit 61A for transmitting an input information of the input unit 1A to a request party, a display control unit 62A for developing the text and the graphics which are displayed on the display unit 2A, a communication control unit 63A for controlling the communication unit 5A, a print control unit 64A for preparing a print image data by describing the text and the graphics to be indicated to print and for transmitting the print image to the color laser printer 21A, a file control unit 65A for preparing a file to the external memory unit 4A and for reading out and writing in of the file, and an application unit 66A for indicating a display a document data to the display control unit 62A and for indicating the print to the print control unit 64A.

On the other hand, the color laser printer 21A is constituted by a memory unit 7A such as a semiconductor memory for storing the print image data etc. which are transmitted from the control program and the personal computer 20A, a communication unit 8A such as a centronics etc. for carrying out the communication with the personal computer 20A, a printer control unit 9A such as a LSI etc. which assist a function of a communication control unit 91A and a data control unit 92A for controlling the communication unit 8A, and a printer engine 10A for executing a paper feed, a paper print, and a paper exit of a recording paper.

The printer control unit 9A is constituted by the communication control unit 91A for storing the printer image data to the memory unit 7A by controlling the communication unit 8A, the data control unit 92A for converting a data which can print the received print image data in the printer engine 10A, and an engine control unit 93A for carrying out a control of a mechanical component which carries out a process of the paper feed, the paper print and the paper exit of the printer engine 10A. Further, the personal computer 20A and the color laser printer 21A are connected through a printer cable 22A.

Next, a process summary during a color print process of the information print system and the image processing apparatus will be explained referring to FIG. 1 and in the personal computer 20A following processes are carried out.

Namely, against to the print indication of the text and the graphics from the application unit 66A, in the print control unit 64A the text and the graphics are developed to a print use color image. In this case, in a print image development unit 641A, red, green, and blue (hereinafter, they are expressed by R, G, and B) are developed a color continuous tone data having 256 tones (a color multi-valued digit data having 256 gradations).

Next, during a development finish of a data corresponding to one page part, in a data compression unit 642A a data compression is carried out and the compressed data is transmitted to the color laser printer 21A. Herein, the data compression uses a block approximation coding compression of a fixed rate compression method and MH (Modify Hofmann) compression of a variable rate compression method.

On the other hand, in the color laser printer 21A, a compressed data, which is received in the data process unit 92A, is extended at a data extension unit 921A.

Next, after a color of the extended data is corrected at a color correction unit 922A in a color space of the printer, at a color conversion process unit 923A, R, G, and B are converted to three primary colors of yellow, magenta, and cyan. And after that a generation process (BG) of a black component and an under color removal (UCR) process of the black color are carried out and they are converted to the actual print colors comprised of yellow, magenta, cyan, and black (hereinafter, they are called as Y, M, C, and K).

Next, suiting to the characteristic of the printer, at a gamma correction unit 924A, an adjustment of a tone intensity is carried out by separating the print color each, at a first halftoning unit 925A, every the print color each, according to a condition, they are converted to values of three pulse widths of an "on edge", a "near edge", and a "flat (not edge)".

Next, at an image area segmentation unit 926A, a condition of pixel (the "on edge", the "near edge", and the "flat (not edge)") is judged and a pulse width value of the first halftoning unit 925A is selected, at a second halftoning unit 927A, a pulse width according to a pulse width value is outputted to the printer engine 10A and one dot is expressed to a continuos tone (a multi-valued gradation) and the print is carried out.

Further, these processes are carried out by synchronizing a data which outputs to the printer engine control unit 93A and a series of the processes is carried out repeatedly and consequently the print about one page part is carried out.

Further, the process contents of the color correction unit 922A, the color conversion process unit 923A, the gamma correction unit 924A, and the image area segmentation unit 926A are varied in accordance with an indication of a color process indication unit 643A of the personal computer 20A. For example, in the color laser printer 21A, since plural process are provided in advance, it is sufficient to indicate a number of the process. Further, in a case where the process content which is not provided in the color laser printer 21A is indicated, it is sufficient to transmit a table for expressing the process content etc. from the personal computer 20A.

Next, concrete essential factor techniques of this embodiment of the information print system and the image processing apparatus according to the present invention will be explained.

(1) Block Approximation Coding Compression Process and Extension Process

A block approximation coding compression works a role in which a color continuous tone data about a whole one page part is divided into a small rectangle block (for example, such as 8×8 pixel, 4×4 pixel, etc.) and a data of the respective block is compressed.

Next, the block approximation coding compression in this block will be explained by taking an example in which a block comprising 4×4 pixel is truncated to two colors and using a flow chart shown in FIG. 3 and a view showing the pixel arrangement shown in FIG. 4 and also a view showing the data style shown in FIG. 5.

First of all, as shown in FIG. 4(A), R, G, and B of the pixel in one block are taken and a color having the maximum amplitude is requested, and as shown in a quadrangle shown in a broken line of FIG. 4(B), an intermediate value of an amplitude range of the color having the maximum amplitude is requested, and further as shown with ○, ● in FIG. 4(B), using a relative size relationship to the intermediate value, they are classified into two groups.

Next, as shown with □, ■ in FIG. 4(B), an average value of the respective group is haven an approximation color of the group and finally a group attribute of each pixel (a selection information for using which approximation color is one bit per one pixel) and an approximation color is outputted.

Figure 3:
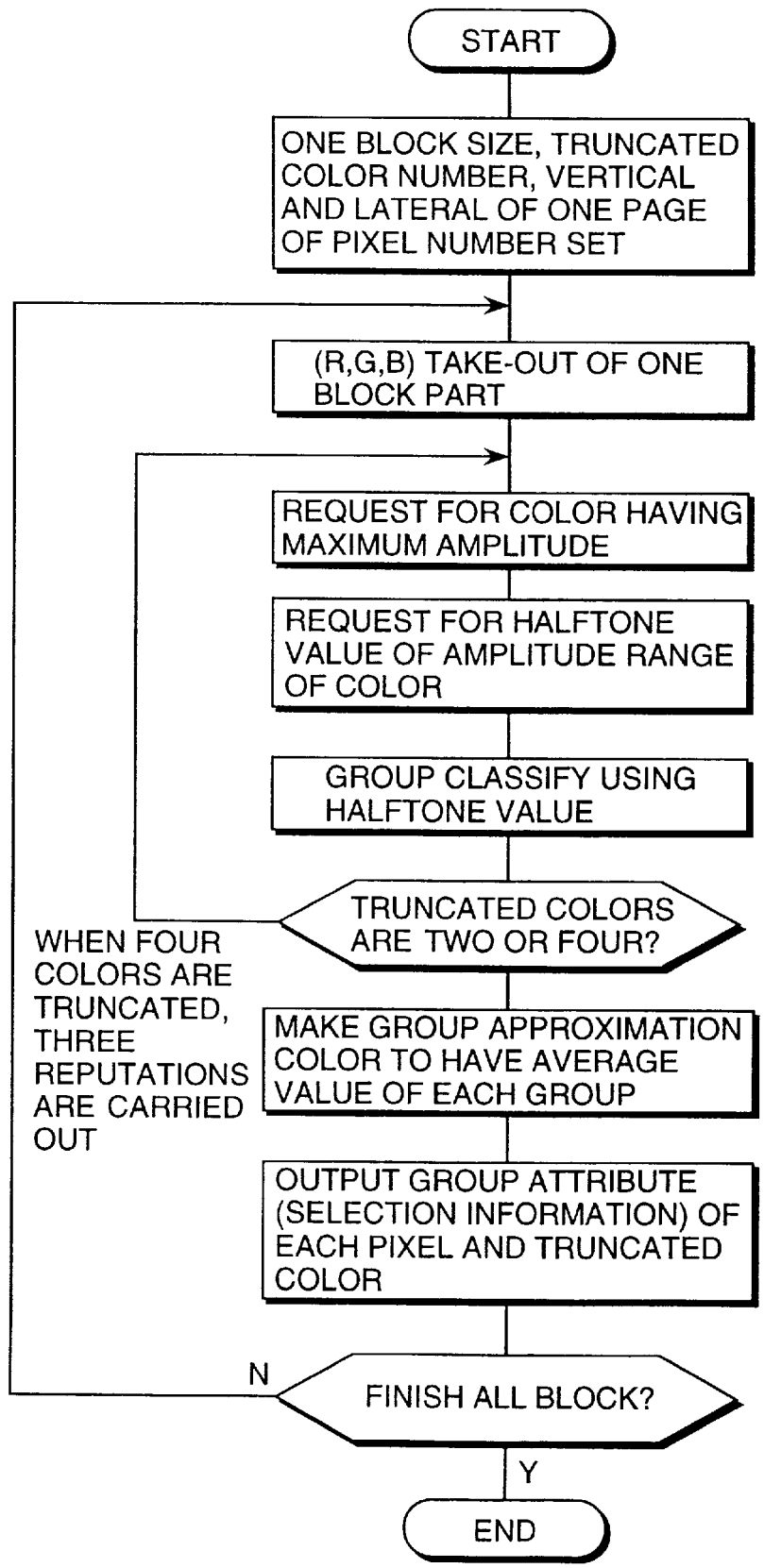
FIG. 3 is a flow chart showing an approximation coding compression motion of a block.

The above stated process is carried out in the print control unit 64A using the flow chart shown in FIG. 3.

As to the data style, for example, in a case where it is truncated as shown in FIG. 5(A), the data about R, G, and B is 256 tones (gradations) and is one bite each, and as shown in FIG. 5(B), as against to an original data is 48 bites, a compressed data is 8 bites and as a result a compression rate is ⅙.

Further, in a case where 8×8 pixel block is truncated to two colors, as shown in FIG. 5(C), as against an original data is 192 bites, a compressed data is 14 bites, and as a result compression rate is 7/96. As understood from the above stated example, in a case of the same number of the approximation color, the pixel number of the block is made larger, a compression effect is further heightened.

Herein, since the block approximation coding compression has not a reversibility property, according to circumferences a picture quality may change. However, a case where only two colors are used, (for example, on a background having the same color, and a text having a separate and another same color exists), it has a feature that the picture quality is not entirely change and this does not appear in a general fixed rate compression system.

Figure 6:
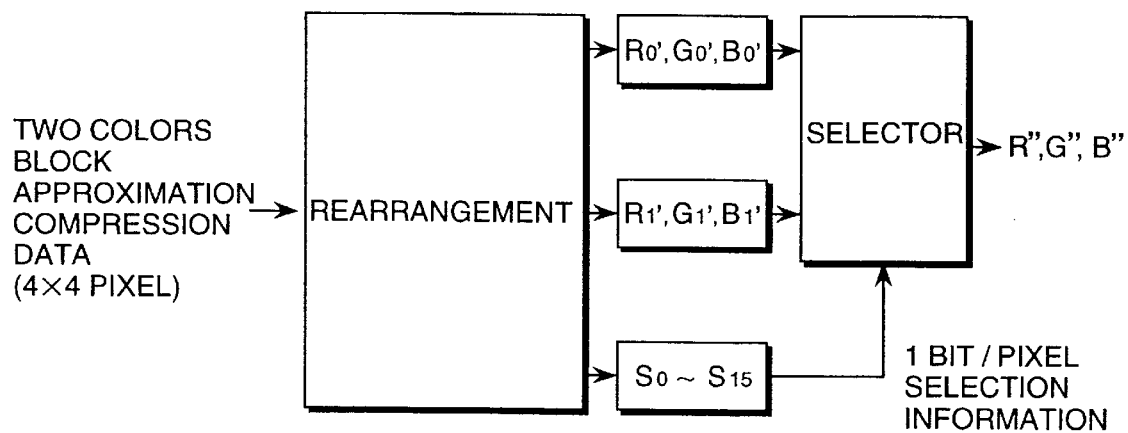
FIG. 6 is a view showing an extension circuit of an approximation coding compression motion of a block.

On the other hand, with respect to an extension of the block approximation coding compression data, according to a selection information only it is converted either of the two approximation colors. Since the data extension unit 921A can be realized using a simple circuitry as shown in FIG. 6, the extension process can be carried out by synchronizing the data which output to the printer engine control unit 93A.

With the above stated process, the data after the extension process is unnecessary to store using enormous memories, a memory construction having a small capacity can be attained.

(2) Color Correction Process

A color correction process is that the color space of an original data is divided into small blocks in which, for example, the color space is divided equally into 16 parts with respect to a respective axis, and a color correction table for storing a coordinate after the correction of the respective apex of the small blocks is prepared.

Figure 7:
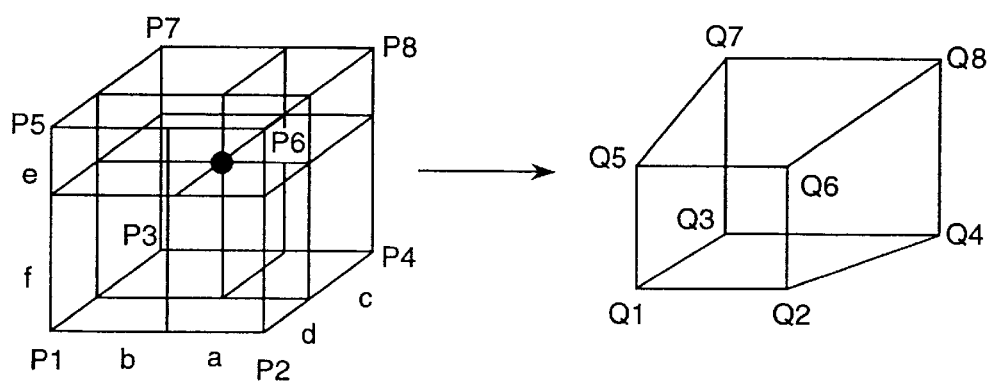
FIG. 7 is a view showing a conversion of a color correction process.

The color correction process in the block is carried out by referring to the above color correction table, and thus, as shown in FIG. 7, the color correction process is carried out. This color correction process is carried out using following color correction conversion formula and a linear correction process is carried out.

Color correction formula:

$$R=ex\{cx(a \times Q1R+b \times Q2R)+dx(a \times Q3R+b \times Q4R)+fx\{cxQ5R+b \times Q6R)+dx(a \times Q7R+b \times Q8R)\}$$

$$G=ex\{cx(a \times Q1G+b \times Q2G)+dx(a \times Q3G+b \times Q4G)+fx\{cxQ5G+b \times Q6G)+dx(a \times Q7G+b \times Q8G)\}$$

$$B=ex\{cx(a \times Q1B+b \times Q2B)+dx(a \times Q3B+b \times Q4B)+fx\{cxQ5B+b \times Q6B)+dx(a \times Q7B+b \times Q8B)\}$$

Herein, (a, b), (c, d), (e, f) are a respective interior division ratio;

(Q1, Q2, Q3, Q4, Q5, Q6, Q7, Q8) are a respective mapping correspondence point;

Q1R–Q8R is a R component of the respective mapping correspondence point;

Q1G–Q8G is a G component of the respective mapping correspondence point; and

Q1B–Q8B is a B component of the respective mapping correspondence point.

Variations of the above stated conversion formula:

$$R=(a\times c\times e\times Q1R)+(b\times c\times e\times Q2R)+(a\times d\times e\times Q3R)+(b\times d\times e\times Q4R)+(a\times c\times f\times Q5R)+(b\times c\times f\times Q6R)+(a\times d\times f\times Q7R)+(b\times c\times f\times Q8R)$$

$$G=(a\times c\times e\times Q1G)+(b\times c\times e\times Q2G)+(a\times d\times e\times Q3G)+(b\times d\times e\times Q4G)+(a\times c\times f\times Q5G)+(b\times c\times f\times Q6G)+(a\times d\times f\times Q7G)+(b\times c\times f\times Q8G)$$

$$B=(a\times c\times e\times Q1B)+(b\times c\times e\times Q2B)+(a\times d\times e\times Q3B)+(b\times d\times e\times Q4B)+(a\times c\times f\times Q5B)+(b\times c\times f\times Q6B)+(a\times d\times f\times Q7B)+(b\times c\times f\times Q8B)$$

By the contents of these color correction tables are varied and the color correction process can be altered.

Further, since a coefficient of a multiplication (three multiplication efficient using a, b, c, d, e, f) of the each color is not depended to the contents of the color correction tables, by preparing a color correction efficient table, it can be attained a high speed process.

(3) Color Conversion Process

In a color conversion process, the data of R, G, and B is converted to three primary color for the print which are Y=255−B, M=255−G, and C=255−R, and next a conversion process about the generation of the black component and the under color removal of the black component is carried out referring to a black generation (BG) table and the under color removal (UCR) table (Y, M, and C has a respective separate table) as shown in FIG. 8. The conversion formula are as following.

Conversion formula:

$$K=Ka$$

$$Y=Y-YKa$$

$$M=M-MKa$$

$$C=C-CKa$$

Further, by altering the contents of the respective table, the process content can be altered.

(4) Gamma Correction Process

The gamma correction process is carried out to convert referring to a gamma table of a respective and separate color as shown in FIG. 9. The conversion formula are as following.

Conversion formula:

$$K=K\gamma(K)$$

$$Y=Y\gamma(Y)$$

$$M=M\gamma(M)$$

$$C=C\gamma(C)$$

Further, by altering the content of the respective table, the process content can be altered.

(5) First Halftoning Process

Figure 10:
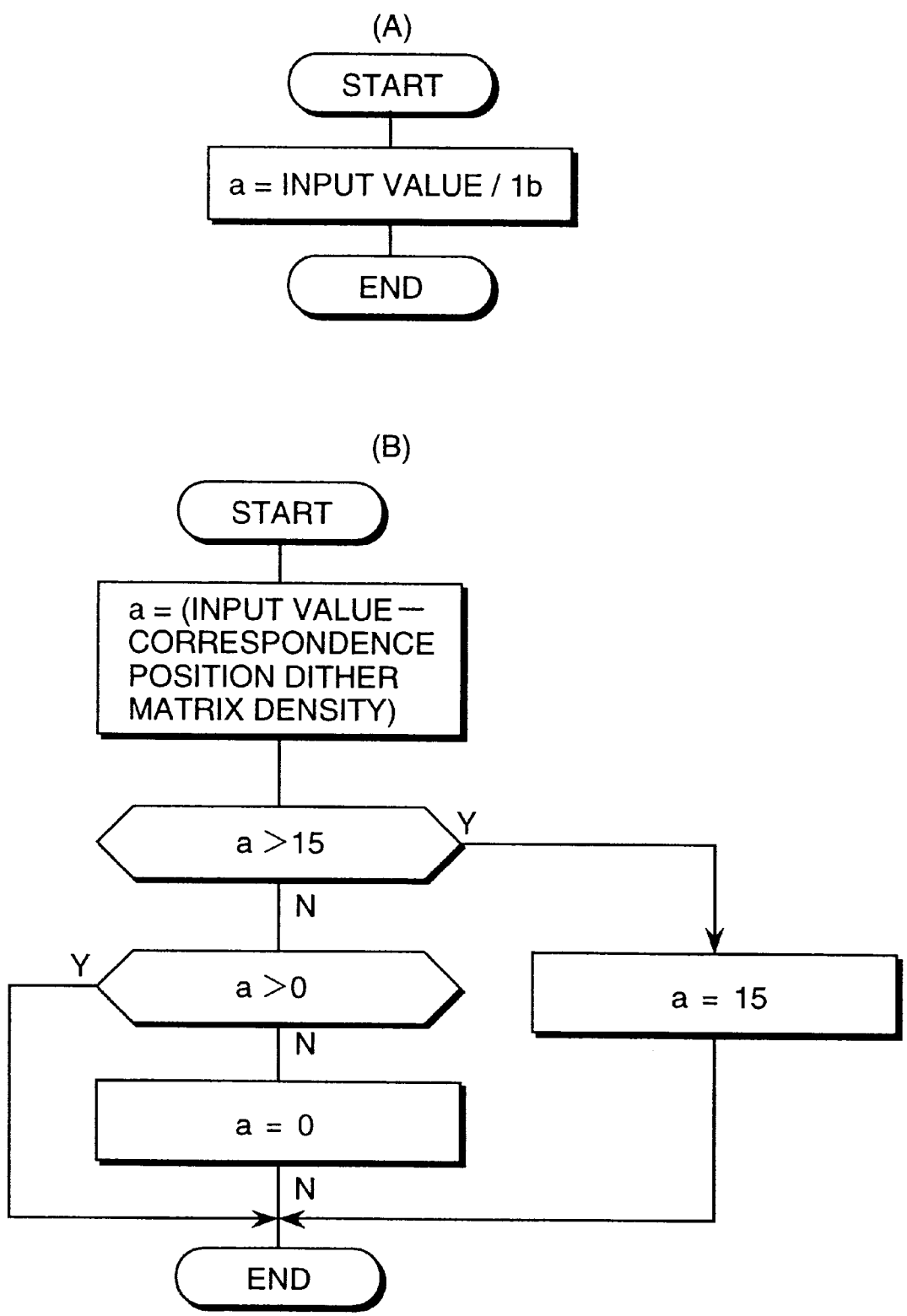
FIG. 10 is a view showing a motion of a first halftoning process.

With respect to an "on edge" unit, a sharpness of the edge of the text and the line is emphasized by setting only a high rank 4 bits to a pulse width value as shown in FIG. 10(A). With respect to a "flat (not edge)" unit, to heighten a reproduction property, a screen angle of a dither matrix of a net type of each color is changed, as a result a sharp picture in which a miss color registration can be outputted.

Further, a process content about a concrete one pixel, as shown in FIG. 10(B), when a difference part (a tone intensity of an input data dither matrix at a correspondence position) is more than a predetermined value, a maximum pulse width value (15) is set and on the other hand when the difference part is less than 0 (zero), a pulse width value 0 (zero) is set, and except for the above cases the difference part is set to the pulse width value.

Further, with respect to a "near edge" unit, using a dither matrix shown in FIG. 10(B) in which a dither matrix has a halftone expression of the both, as a result a pulse width value is set.

(6) Image Area Segmentation Process

Figure 11:
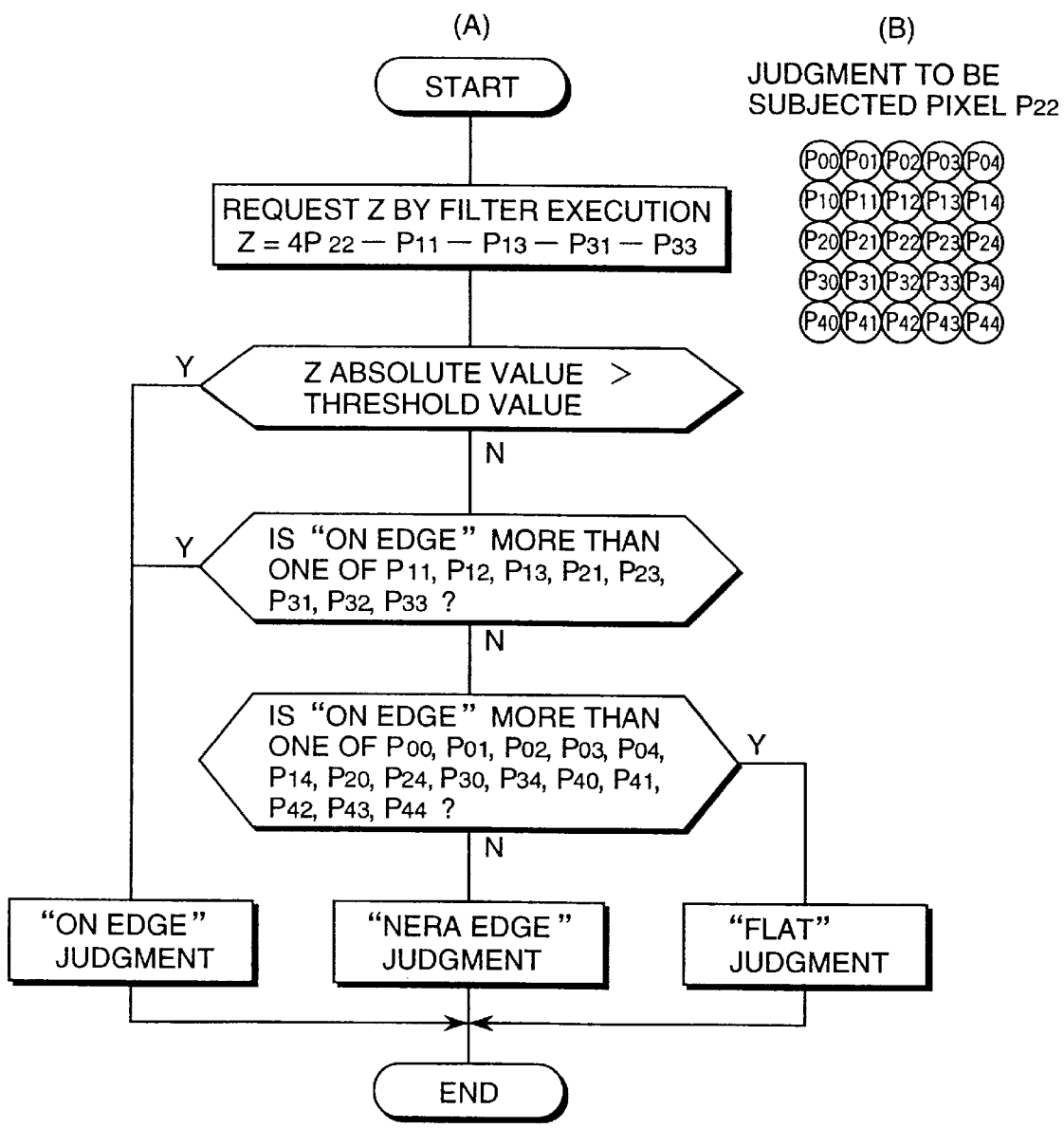
FIG. 11 is a view showing a motion of an image area segmentation process.

Relating to one pixel unit every color each, referring to a condition of a pixel at a vicinity as shown in a flow chart of FIG. 11(A), one condition is selected from three conditions (the "on edge", the "near edge", and the "flat (not edge)").

In concretely, in a case where P22 shown in FIG. 11(B) is a subjective to be judged, using a filter execution, Z (Z=4P22−P11−P13−P33) is requested, and when an absolute value of Z is larger than a certain threshold value, it judges as the "on edge". Next, the pixel, which is judged as the edge at a vicinity at a range of one pixel of P22, is more than one, in such case it judges as the "on edge".

Next, the pixel, which is judged as the edge at a vicinity at a range of two pixels of P22, is more than one, in such case it judges as the "near edge". Except for the above two cases, it judges as the "flat (not edge)".

One among three pulse width values which is requested by the first halftoning corresponding to this judgment result is outputted.

(7) Second Halftoning Process

Using a pulse width value (16 levels comprised from 0 to 15) which is selected in the image area segmentation, the pulse width is outputted to the printer engine 10A and one pixel is expressed by the continuous tone. Further, when the pulse width is made large, the more many laser light strikes and the more charging amount obtains, accordingly a dimension about one pixel is made thick at a primary scanning direction.

Figure 12:
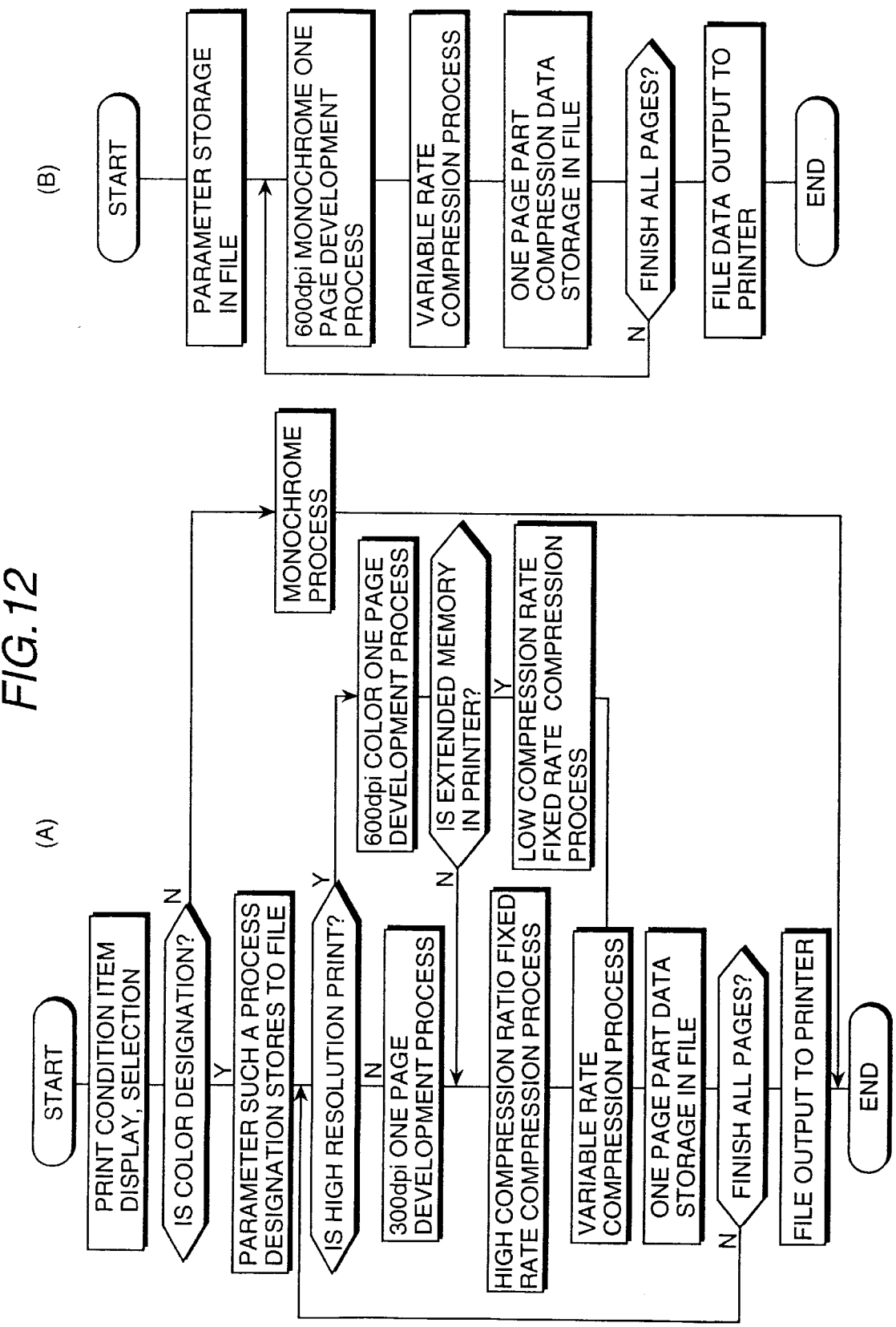
FIG. 12 is a flow chart showing a print motion of a personal computer.

Next, a print motion about one page of the information print system and the image processing apparatus according to the present invention will be explained in detail. First of all, a motion about the personal computer 20A will be explained using flow charts shown in FIG. 12(A) and FIG. 12(B).

When the print is indicated, the personal computer 20A carries out a display and a selection of setting items of a print condition to a display apparatus of the personal computer 20A.

The setting items of the print condition are the color print, a high resolution, the color correction, the gamma correction, a dither etc. and in case of a designation for the color print a following process is carried out.

Figure 13:
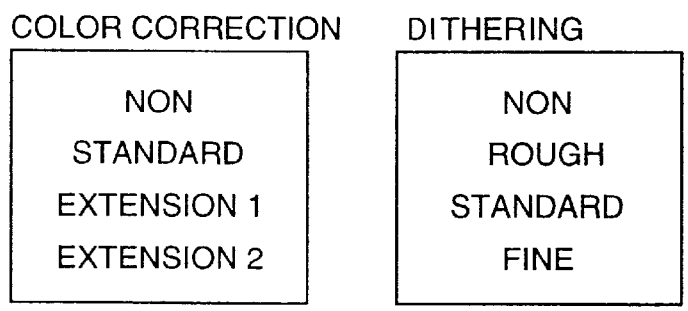
FIG. 13 is a view showing a condition display screen during a print process.
Figure 15:
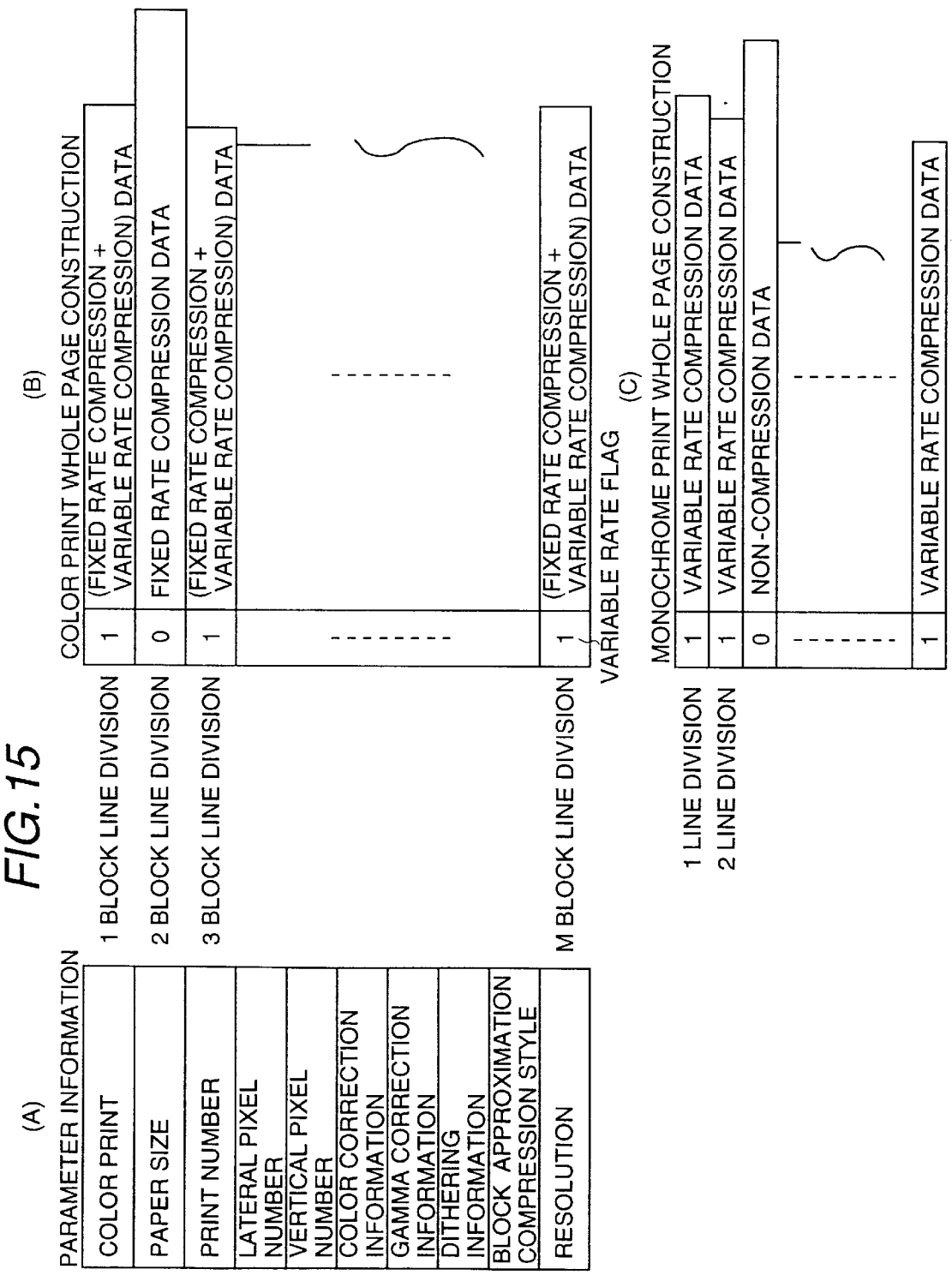
FIG. 15 is a view showing a data construction which is transmitted to a color laser printer.

A parameter of the color process designation etc. shown in FIG. 13 is stored to a file as a parameter information which is a style shown in FIG. 15(A). In a case where the high resolution print is designated, a print image about one page part having a color continuous tone data of 600 dpi is prepared, on the other hand in a case where the high resolution print is not designated, a print image about one page part having a color continuous tone data of 300 dpi is prepared.

In the case of the color continuous tone data of 300 dpi, since a data capacity is small in comparison with the color continuous tone data of 600 dpi, a fixed rate compression of a two color approximation of 4×4 pixel block having a small compression effect is carried out. In this case, the compression rate is ⅙.

On the other hand, in the case of the color continuous tone data of 600 dpi, since a data capacity is large, at a standard condition of a memory capacity of the memory unit 7A of the color laser printer 21A, a fixed rate compression of a two color approximation of 8×8 pixel block having a large compression effect is carried out. In this case, the compression rate is 7/96.

Further, in a case where an extended memory is added, the compression effect is small but the fixed rate compression of the two color approximation of 4×4 pixel block having a small inferior picture quality is carried out. Herein, an example where a dimension of the pixel block is altered is shown, however it is possible to use four colors of a number of the approximation colors by making the same the dimension of the pixel block.

Figure 14:
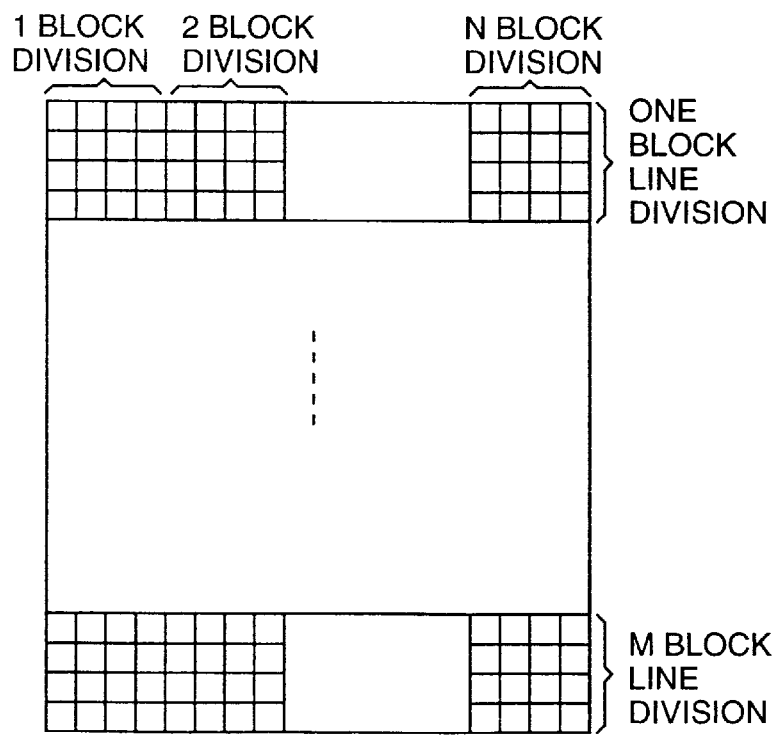
FIG. 14 is a view showing an unit for carrying out a variable rate compression after an approximation coding compression of a block.

Next, the data after the fixed rate compression is carried out a variable rate compression (Modify Hofmann (MH) compression) at every block line each as shown in FIG. 14, in this time in a case where the capacity of the above stated data is larger than that of the original data, then the variable rate compression is not carried out.

Further, at a head unit of each block line, a flag showing a variable rate compression data as shown in FIG. 15(B) is provided. Further, in a case of a landscape (a print for a long width paper), the variable rate compression is not carried out over a whole one page part. Finally, after the compressed data about a whole one page part as shown in FIG. 15(B) has stored in the file, the data in the file is transmitted to the color laser printer 21A.

On the other hand, in a case of a monochrome print, first of all similarly to the color print, a parameter information is stored. Next, a print image about a monochrome binary digit value of 600 dpi with one page part is prepared. Further, a variable rate compression with one raster unit is carried out, a compressed data about one page part as shown in FIG. 15(C) is prepared and after that this compressed data is stored in the file and the data in the file is transmitted to the color laser printer 21A.

Figure 16:
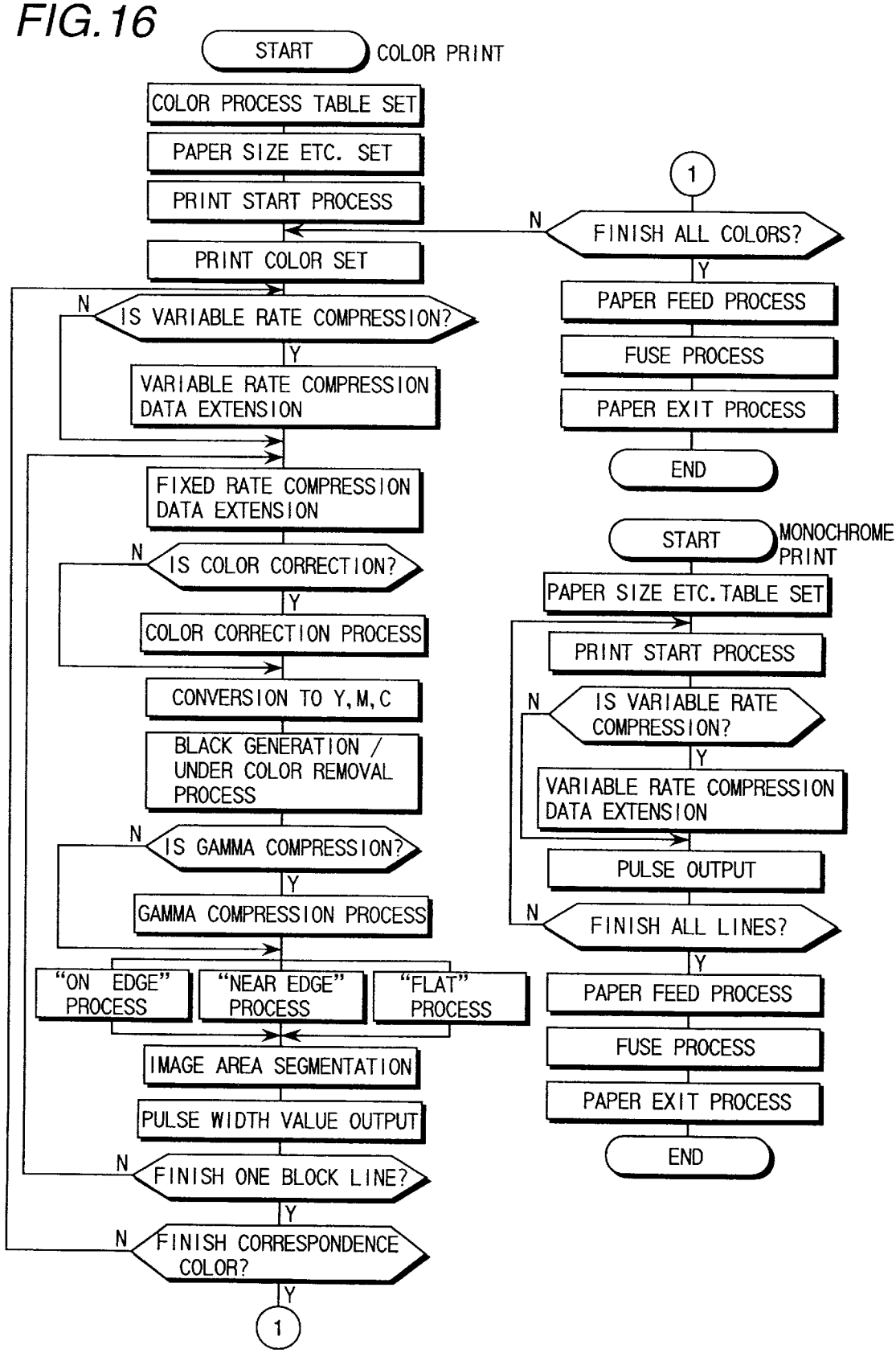
FIG. 16 is a flow chart showing a print motion of a color laser printer.

Next, a motion of the color laser printer 21A will be explained referring to a flow chart shown in FIG. 16. In this case, a print example about a portrait having 600 dpi will be explained.

In a case of the color print, a sort of a table for necessary to carry out the color processing is set, in this time in a case where the color laser printer 21A has a resource therein, a table which is provided an interior portion therein is set, on the other hand in a case where a data of the table is transmitted from the personal computer 20A, such an above stated table is set.

Next, after a notice of a color print mode, a paper size to be printed, and a print start to the engine control unit 93A, a following process is carried out. Accordingly, a data with one pixel unit (a pulse width output) is outputted to synchronize to the print motion of the printer engine 10A.

First of all, the print color is set as Y (Y in the page, M in the page, C in the page, and K in the page, in order) and a next an extension of a variable rate compression data having one block line part is carried out referring to a variable rate flag.

Next, referring to a block approximation coding compression style of a parameter information, a pixel block number and an approximation color number are judged and an extension of the block approximation coding compression style is carried out in accordance with a correspondence style.

Next, in a case where a color correction is designated, the color correction process is carried out and after that the color conversion process is carried out and in a case where the gamma correction is designated, the gamma correction process is carried out.

Next, the first halftoning process is carried out, after one pulse width value has selected according to a judgment result of the image area segmentation process, the second halftoning process is carried out using an obtained pulse width value.

The second halftoning process is carried out repeatedly from the extension of the fixed rate compression data until one block line finish, and in a case of a break portion of the block line, the second halftoning process is carried out repeatedly from the extension of the variable rate compression data. Accordingly, one print color about one page part is processed and toners of a correspondence color are adhered to a transfer belt.

Similarly to the above, the processes are carried out about M, C, and K in order, and when the process about all colors has finished, after the paper feed of the recording paper, the toners on the transfer belt are fused to the recording paper and the recording paper is exited.

Further, in a case of the color print having 300 dpi, one pixel is outputted twice times against to the primary scanning direction but one raster is outputted twice times against to a secondary scanning direction. Accordingly, the data having 600 dpi is outputted the printer engine 10A.

On the other hand, in the case of the monochrome print, after a notice about a monochrome print mode, a paper size to be printed, and a print start to the engine control unit 93A, the variable rate compression data is extended in accordance with the content of the variable rate flag, the data of the binary digit monochrome is outputted to synchronize to the print motion of the printer engine 10A and then the print is carried out.

As stated in above, since the print image is compressed with the fixed rate, a transmission time can be shortened necessarily less than a predetermined time. Further, by the employment of the fixed rate compression coding process, the print can be carried out without a necessity of the enormous memories for the extension. Further, the color processing suited for the printing characteristic of the color laser printer can be realized using a simple circuitry.

Further, in the case of the color print, since the color continuous tone data (an analog data having a respective color tone (gradation)) is sent, a high quality print suited for the printing characteristic of the color laser printer can be carried out. On the other hand, in the case of the monochrome print, since the binary digit monochrome data is transmitted, a data transmission amount can be lessened and a high speed print can be carried out.

Further, in the personal computer 20A, since a RGB style print image is prepared without taking into the printing characteristic of the color laser printer 21A, a dependency about a kind in an equipment can be lessened and a developing time for the personal computer 20A can be shortened. Further, since all the color processes relating to the printing characteristic of the color laser printer 21A are processed in the color laser printer 21A, the color processes which require the large process time can be carried out at a high speed by mounting an exclusive hard ware.

Next, the color print about the landscape will be explained referring to FIG. 17(A) and FIG. 17(B). In the case of the color print about the landscape, it can be treated as a data being only fixed rate compression. Viewing the print image prepared by the personal computer 20A, as shown in FIG.

Figure 17:
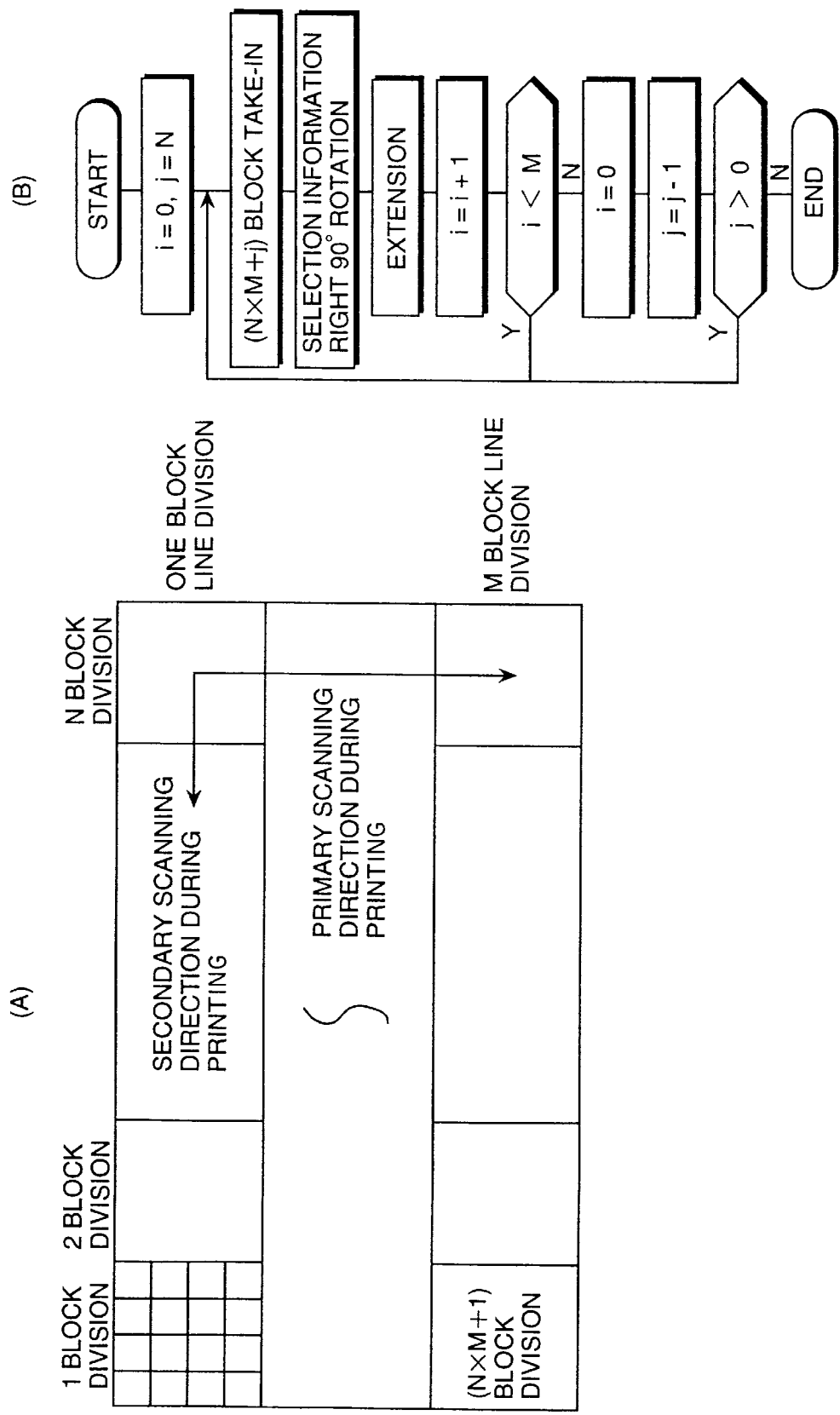
FIG. 17 is a view and a flow chart showing a print about a rotation of an approximation compression coding data of a block.

17(A), from a primary scanning direction and a secondary scanning direction, as shown in a flow chart of FIG. 17(B), a taken-in part of each block is altered through a simple calculation, the color print can be carried out only by 90 degree rotation of the selection information toward a right direction. As a result, the rotation of the color print can be realized without a necessity of any specific memory.

As clearly understood from the above stated explanation, the attainments of following operations and effects of this embodiment according to the present invention will be comprehended.

The compression means compresses the print image data to shorten the data transmission time during the sending of the printed image data which is described at the side of the information processing equipment. The extension means extends to the original print image data by the outputting apparatus during the print of the print image data which is received and compressed in the outputting apparatus. The processing means about the picture quality can correct to suit the print image data described in the side of the information processing equipment to the printing characteristic of the outputting apparatus. Accordingly, a high quality print can be carried out.

Further, since the compression is processed by the fixed rate compression coding means, the memory capacity for storing the print image for necessary the print equipment can be reduced, and further since the print image with the compressed data is rotated easily using the rotating means, accordingly the memory capacity of the print equipment can be reduced.

For the compression and/or the extension, the variable rate compression means and/or the variable rate extension means are used, it is possible to carry out the high compression in comparison with the fixed rate compression means and/or the fixed rate extension means, accordingly the data transmission time can be shortened further.

For the compression and/or the extension, the block approximation compression which compresses and/or extends with the fixed rate is used, the data transmission time can be shortened and it is possible to carry out the data transmission having the small picture inferior, as a result the high quality print can be carried out. Further, (1) the color correction process means carries out the correction from the color space which is haven in the original data to the color space which is haven in the print equipment, (2) the color conversion process means carries out the conversion from the print image data which is described in the light three primary colors (red, green, and blue) in the information process equipment to the print three primary colors (cyan, magenta, and yellow) which are required in the print equipment and further carries out the conversion from the print three primary colors to the actual print colors (cyan, magenta, yellow, and black) by carrying out the generation (BG) of the black component and the under color removal (UCR) of the black component in the print three primary colors, (3) the gamma correction process means carries out the correction of the respective adjustment of the tone intensity about each print color by suiting to the characteristic of the print equipment, (4) the first halftoning process means carries out respectively the tone process by using the plural kinds of the different dither matrix etc., (5) the image area segmentation process means carries out to select the toner process data suited to the pixel to be subjected under the content of the pixel to be subjected and the vicinity pixel from the data which is tone processed respectively in the first halftoning process means, (6) the second halftoning process means performs the tone expression by the pulse width modulation (PWM) etc. and the tone intensity change which can not be corrected only the first halftoning process means is carried out more fine to tone correct, thereby the high quality print suited for the printing characteristic of the printer as the outputting apparatus can be carried out.

Further, by the combination of the fixed rate compression process with the variable rate compression process, relating to the print image data, in the case of the practice of the color print, the fixed rate compression process is used, and in a case where the data amount is made small and when the variable rate compression process is necessary, the variable rate compression process is used. In a case where the print image data is carried out to print the monochrome print, the above stated combination works to use the variable rate compression process and the compression selection process means works to select most suitably the above stated combination of the compression processes.

Further, the printing resolution of the resolution conversion print means of the print equipment is constant, however the signal process conversion of the print image data is carried out, it is possible to carry out the print about the plural kinds of the resolutions, as a result it is possible to carry out the print of the different solution in the same print equipment.

Further, in the memory extension means, the memory capacity in the print equipment can be extended easily and by the extension of the memory it is possible to carry out a continuous print process under the various print conditions.

Further, in the picture quality process alteration means, the picture quality process content which is stored in the print equipment can be altered and means for indication the picture quality alteration in the side of the information processing equipment can be altered the process content, accordingly it is possible to alter easily the picture quality process content in the outputting apparatus.

According to this embodiment of the information print system and the image processing apparatus according to the present invention, following effects can be obtained.

Namely the transmission time of the print image data can be shortened necessarily less than a predetermined time and the print time can be shortened. Further, by the employment of the fixed rate compression, the enormous data for the extension is unnecessary, accordingly the low cost printer can be provided.

Further, in the block approximation compression and extension method, since the picture quality inferior is small, the high quality print can be carried out even with the low cost printer. Since the extension of the block approximation compression data can be constituted with a simple circuitry, it is possible to process the extension process and the print process by synchronizing and as a result the high speed print can be attained. Further, since the color process suited to the printing characteristic of the printer can be realized with the simple circuitry, the high quality print can be carried out even with the low price printer.

Next, another first embodiment of an image processing apparatus of the information print system and the image processing apparatus according to the present invention will be explained, prior to this another first embodiment, a conventional image processing method will be explained.

In the conventional image processing, against to a bitmap image data constituted by a multi-value (plural bits, for example 8 bits), with the image of each pixel, a necessary image processing about the color correction and the color conversion process or an edge process etc. is carried out. Accordingly, to store the bitmap image data, there is a problem that it is necessary to provide a memory having a large capacity.

Further, in the above stated conventional image processing apparatus, against to the bitmap image data, the necessary image process about the color correction process and the color conversion process or the edge process etc. is carried out in order every the respective process each. Accordingly, there is a problem that to carry out all of the necessary image processes it takes many time. Therefore, in the another first embodiment of the image processing apparatus according to the present invention, to solve the above stated problems, it will be proposed a following construction.

Figure 18:
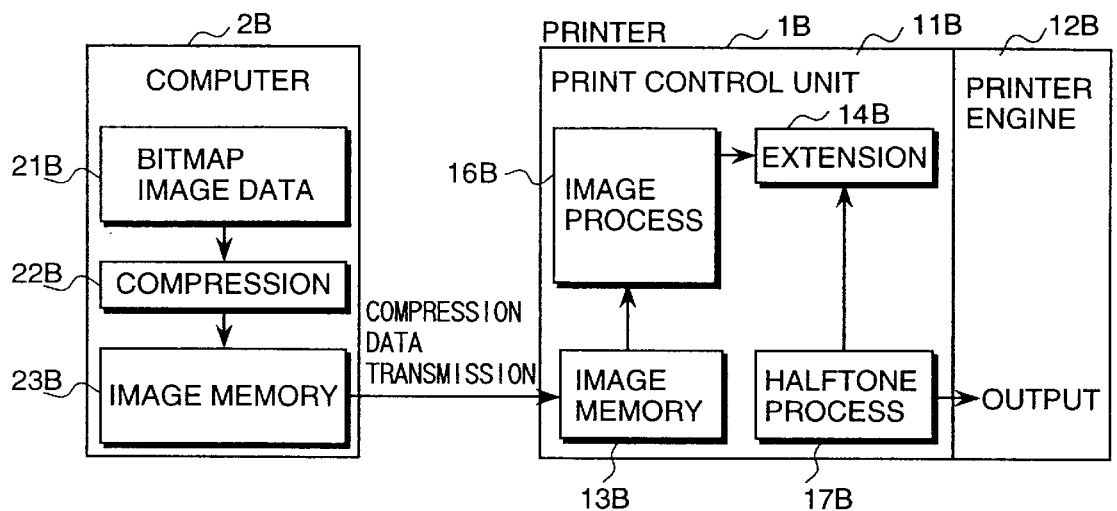
FIG. 18 is a schematic view for explaining another embodiment of a printer of an information print system and an image processing apparatus according to the present invention.

In FIG. 18, in a computer 1B, a bitmap image data 21B to be outputted to a printer 2B is converted to a compressed image data which are comprised of a color data signal and a color selection data signal in a compression unit 22B which is realized with a printer driver and stores in an image memory 23B. After that, through a data transmission unit not shown in figure, the compressed image data is outputted to the printer 1B.

Herein, the color data signal is a signal for specifying the plural colors in a case where the various colors which are used in the predetermined image area, (for example 4×4 pixel), are truncated with plural colors. In the compression unit 22B, the various colors in the image area which are specified by the bitmap image 21B are truncated to the plural colors under an execution taking into the color space. And, the data showing the truncated various colors is put in a predetermined order and the color data signal is generated.

Further, the color selection data signal is a signal for selecting a color of each pixel in the predetermined image area, (for example 4×4 pixel), from the above stated color data signal. The compression unit 22B, with respect to each pixel in the image area which is specified by the bitmap image data 21B, describes in order of the pixel an information (an order or a number in the color data signal of a correspondence color data), this information specifies a color near to a correspondence picture color from the plural color data which is included in the above stated color data signal, and then the color selection data signal is generated.

Figure 19:
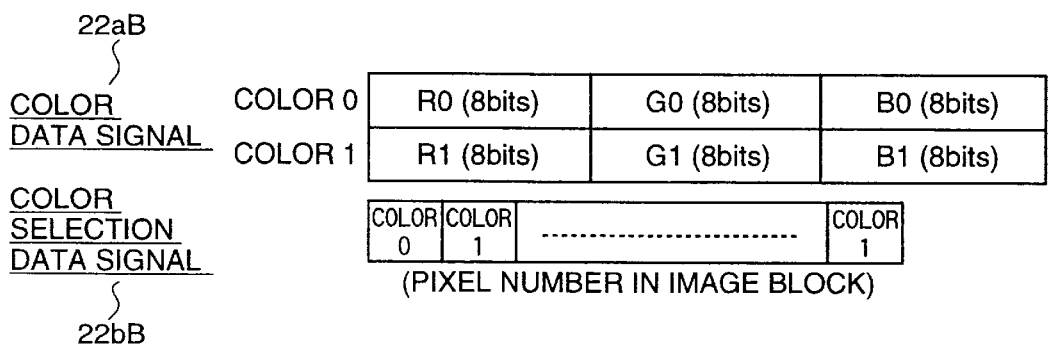
FIG. 19 is a view for explaining a construction example of a compressed image data in a case where colors in a predetermined image area are truncated to plural colors by an execution in which a color space is taken into a consideration.

FIG. 19 is a view for explaining a construction example of the compressed image data in a case where the color in the predetermined image area is truncated to the plural colors by the execution taking into the color space. Herein, a reference numeral 22aB denotes a data construction of the color data signal and a reference numeral 22bB denotes a data construction of the color selection data signal.

In an example shown in FIG. 19, relating to the color data signal, the color which is used in the predetermined image area is truncated to two colors comprised of a color 0 and a color 1 in accordance with the execution taking into the color space.

Figure 20:
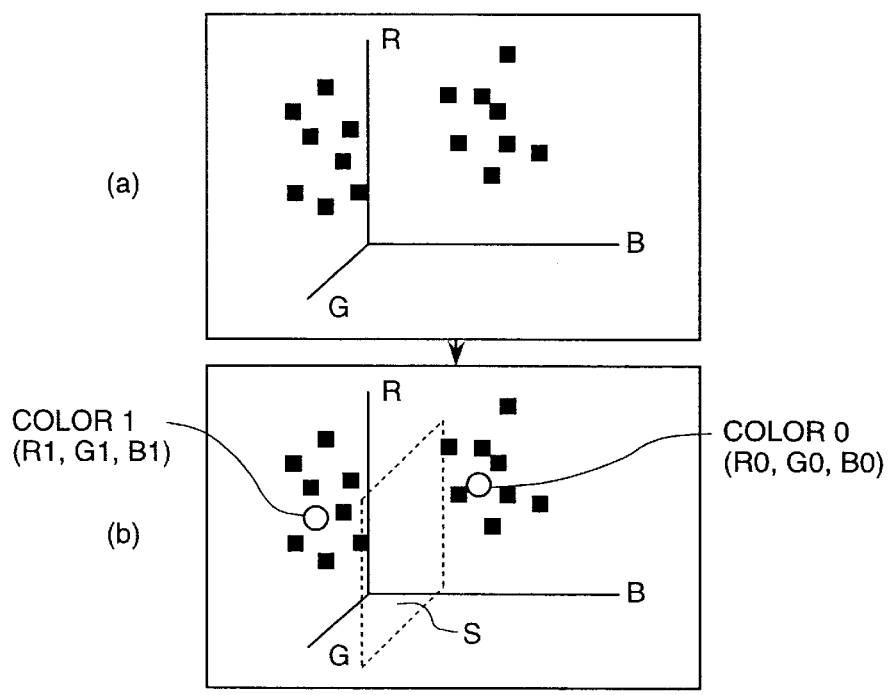
FIG. 20 is a view for explaining a generation process of a color data signal of a compression image data shown in FIG. 19.

In concretely, as shown in FIG. 20, each pixel in the predetermined image area is developed on the color space which is formed the color of R, G, and B as a coordinate axis. (FIG. 20(a)).

And, the above stated color space is divided into two on a certain face S and the above stated each pixel is classified two groups, a color 0 and a color 1 (for example, an average value of the pixel which belongs to the group) for representing each group are set. (FIG. 20(b)). In a case where each color of R, B, and G is expressed by 8 bits data, the color data signal, as shown in FIG. 19, the color 0 and the color 1 becomes 24 bits, and then it becomes 48 bits up to total.

Further, in a case where the color in the predetermined image area is truncated four colors, the color space is divided into voluntary two faces, each pixel in the above stated predetermined image area can classifies the four groups. And it can set a color for representing each group.

In the color selection data signal, relating to each pixel in the above stated predetermined image area, an information (a number) for specifying the approximation color of a correspondence pixel color (a color for representing the group to which such color belongs) is constituted by putting in order of a predetermined order.

As shown in FIG. 19, in a case where the color data signal is constituted of the two colors of the color 0 and the color 1, the color selection data signal is one (1) bit per one (1) pixel. Further, in a case where the color data signal is constituted of the four colors, the color selection data signal is two (2) bits per one (1) pixel.

In a case where each color of R, G, and B is formed of 8 bits data, a bit number of the bitmap pixel comprising 4×4 pixel is 24×16=384 bits, since 24 bits are per one (1) pixel. On the other hand, according to the compressed image data shown in FIG. 19, the bitmap pixel comprising 4×4 pixel can be compressed to 64 bits up to total, namely which is comprised of the color data signal of 48 bits and the color selection data signal of 16 bits.

Return to referring to FIG. 18, when the printer 1B takes in the compressed image data in the above stated construction from the computer 2B, the printer 1B performs to carry out a following motion. First of all, in a print control unit 11B, an image memory 13B stores the taken-in compressed image data.

Next, according to an image process unit 16B, against to the compressed image data which is stored in the image memory 13B, the necessary image process such as the color correction and a rearrangement of the pixel etc. is directly carried out. After that, in an extension unit 14B, the continuous tone image data is carried out to extend to the continuous tone image data per the pixel unit.

After the extension process has finished in the extension unit 14B, in a halftone process unit 17B, a reproduction of the halftone is carried out under a basis of the extended image data. After that, the obtained data is outputted to a printer engine 12B (an image formation unit of the printer). By receiving the outputted data, the printer engine 12B generates the print image in accordance with the data which is received from the print control unit 11B.

In the above stated this embodiment of the information print system and the image processing apparatus according to the present invention, relating to the compressed image data, the compressed image data comprised of the color data signal and the color selection data signal is used. The above stated color data signal is to specify the plural colors which are truncated to the various colors used in the predetermined image area, and further the above stated color selection data signal is put in order at a predetermined order the information for selecting the color from the above stated color data signal with respect to the pixel in the predetermined image area.

For the above stated reasons, the color conversion process from R, G, and B (red, green, and blue) to Y, M, C, and K (yellow, magenta, cyan, and black) etc., the halftone color correction or the other color correction can be carried out directly from the color data signal.

Further, the process for accompanying the rearrangement of the pixel, such as the rotation, the enlargement and the reduction etc. of the image can be carried out directly from the color selection data signal. Further, the image area segmentation process according to the characteristic point such as the "on edge" can be carried out using the both of the color data signal and the color selection data signal.

Namely, whether or not the shade of the image in the predetermined image area can be judged using the color data signal, and further whether or not a change of the color in the predetermined image area can be extracted using the color selection data signal. Accordingly, using these both information, the characteristic point in the predetermined image area can be extracted.

As a result, in this embodiment of the image processing apparatus according to the present invention, using the compressed image data stated in the above construction, the necessary image process is carried out before the extension of the compressed image data. Therefore, the memory capacity necessary for the image process can be reduced and further a circuitry scale can be made small.

Further, in this embodiment of the image processing apparatus according to the present invention, the color correction process and the process for accompanying to the rearrangement of the pixel can be carried out directly by the respective color data signal and the respective color selection data signal, as a result these processes can be carried out in parallel. Accordingly, the time required for the image processing can be shortened.

Further, the compressed image stated in the above construction has a feature in which a compression efficiency (a data length of the compressed data) is constant always. For example, according to the compressed image data shown in FIG. 19, the bitmap image data of 4×4 pixel is compressed always to 64 bits.

As a result, according to this embodiment of the image processing apparatus according to the present invention, in the print control unit 11B, the motion during from the read-out of the compressed image data in the image memory 13B to the halftone process in the halftone process unit 17B can be carried out by synchronizing in accordance with a timing which is required in the printer engine 12B. Namely, it is unnecessary to provide a buffer means for converting the speed.

Figure 21:
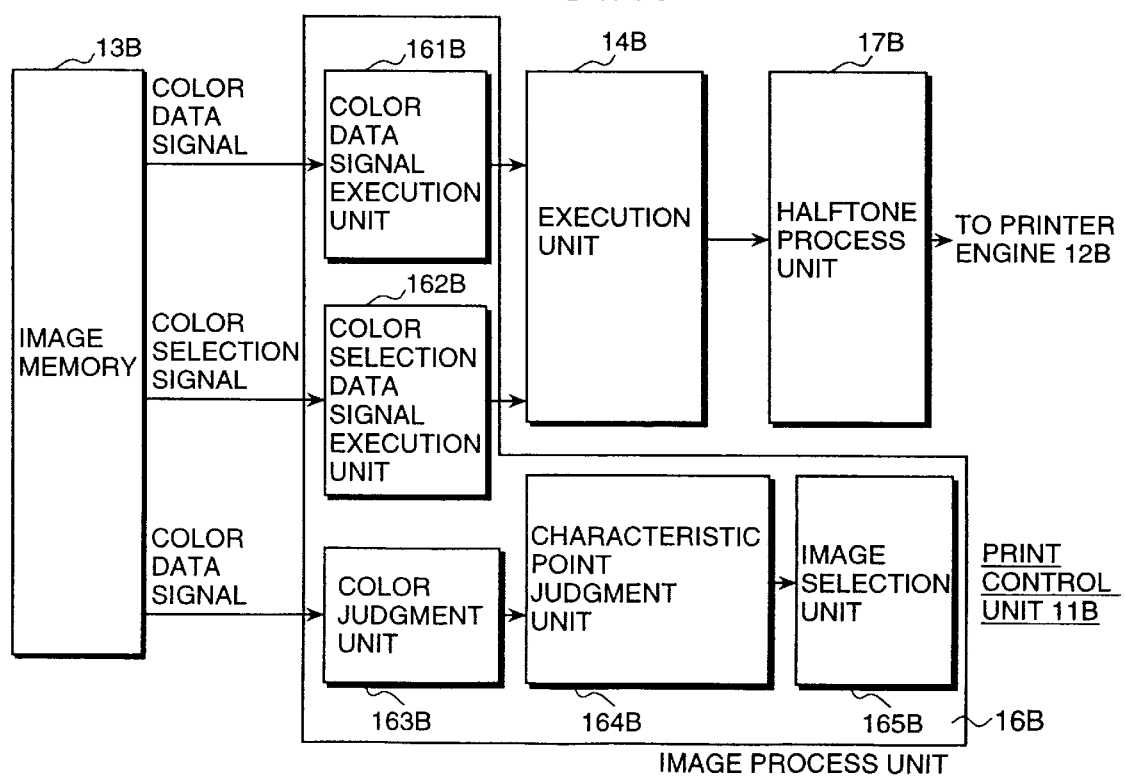
FIG. 21 is a construction block view showing a print control unit 11B shown in FIG. 18.

Next, the print control unit 11B which is an essential unit of this embodiment of the image processing apparatus according to the present invention will be explained in detail. FIG. 21 is a view showing a construction block of the print control unit 11B shown in FIG. 18.

Further, in the construction shown in FIG. 18, as to the printer engine 12B, since this printer engine 12B is similar to a printer engine which has used in the prior, a detailed printer engine construction thereof will be omitted.

First of all, an image process unit 16B will be explained. The image process unit 16B, as shown in FIG. 21, comprises a color data signal execution unit 161B, a color selection data signal execution unit 162B, a color judgment unit 163B, a characteristic point judgment unit 164B, and an image selection unit 165B.

Figure 22:
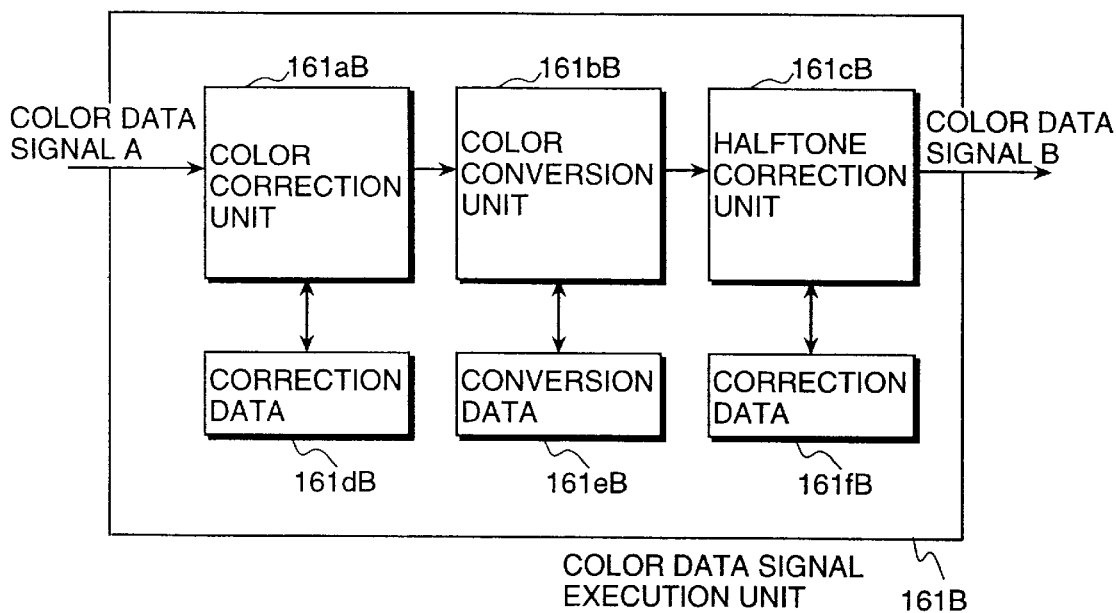
FIG. 22 is a construction block view showing a color data signal execution unit 161B shown in FIG. 21.

The color data signal execution unit 161B carries out the color correction process such as the color conversion process, the color adjustment process or the halftone correction process against to the color data signal. FIG. 22 is a view show ing a construction block of the color data signal execution unit 161B shown in FIG. 21.

Herein, a reference numeral 161aB denotes a color correction unit, 161bB denotes a color conversion process unit, 161cB denotes a halftone correction unit, 161dB–161fB denote memories for storing respectively the correction data used in the color correction unit 161aB, the color conversion process unit 161bB, and the halftone correction unit 161cB.

The color correcti on unit 161aB carries out a process for correcting the color data signal to a color suited for the printer engine 12B. In general, the printer engine 12B has a color characteristic which is peculiar to the apparatus. As a result, according to circumferences the image outputted from the printer engine 12B changes to another color from the color which is specified by the color data signal.

The color correction unit 161B is provided to solve the above stated inconvenience. The color data included in the color data signal is corrected in accordance with the color characteristic of the printer engine 12B. As a method for correction the color, there are a method using a matrix execution, a method using a reference table as a general method, and other methods can be employed. Further, in a case where the color characteristic changes in accordance with the condition of the printer engine 12B, it is preferable to alter referring to the color correction data which is stored in the memory 161dB.

In the color conversion process unit 161dB, the color data included in the color data signal is converted from the data constituted three colors of R, G, and B which are used mainly in a monitor means to the data constituted four colors of Y, M, C, and K which are used mainly in a printer. The above stated conversion process is a process in which one color from the four colors of Y, M, C, and K is generated under a basis of the three colors of R, G, and B. The color conversion process is a technique which has used in the prior, and as a general method, there is a method in which R, G, and B are used as a complementary color of Y, M, C, and K.

In the above stated method, by composing the three colors of R, G, and B, the under color removal (UCR) process and a black color generation (BG) process are carried out. In addition to the above, there are a method in which the color conversion process table is stored in the memory 161eB and referring to this table the color conversion process is carried out and another method in which the color conversion process is carried out using the matrix execution, etc.

Further, in this embodiment of the image processing apparatus according to the present invention, the case in which the present invention is applied to the print control unit is explained. However, in a case where the color conversion process is unnecessary such that an outputted end of the image data is the monitor means, it is unnecessary to provide the color conversion process unit 161bB.

The halftone correction unit 161cB carries out, in the color correction unit 161aB and the color conversion process unit 161bB, a process for improving the halftone reproduction property against to the color data signal which has subjected to the color conversion process. This process is called in general as the gamma correction process.

The color included in the color data signal is constituted of a full scale for reproducing faithful the color. For example, when every color of C, M, Y, and K each has a bit number of 8 bits, every color each has the tone (the gradation) comprised of 256 stages of 0–255.

However, in the image formation apparatus such as a printer, there is a case in which the halftone can not reproduce any voluntary range. For example, in a certain printer, since the halftone is expressed only 50–200 range in 256 stages of 0–255, there are cases where in less than 50 the color is a completely white and more than 200 the color becomes a color in which the tone intensity is not risen beyond.

In the printer stated in above, in a case where one color (one of C, M, Y, and K) constituted a certain color data has a value of 208, it is necessary to rise beyond the tone intensity of the correspondence color.

In the halftone correction unit 161cB, the color data having 256 stages tone per each color is corrected to allot to the halftone reproduction range (50–200) of the printer, accordingly the generation of the above stated inconvenience can be prevented.

As a method of the halftone correction, in generally there are methods using a matrix execution, using a table reference in a general method but it can employ other methods.

Further, in a case where the halftone characteristic is changed according to the condition of the printer engine 12B, it is preferable to alter using referring to the halftone correction data which is stored in the memory 161fB.

Next, the color selection data signal execution unit 162B will be explained. The color selection data signal execution unit 162B carries out a process accompanied to the rearrangement of the pixel such as the rotation, the enlargement, and the reduction of the image.

As to the rotation of the image, it can replace the order of the data of each pixel which constitutes the color selection data signal. For example, in accordance with the rotation angle of the image such as 90 degree, 180 degree, and 270 degree and the rotation direction, the replacement of the data of each pixel which constitutes the color selection data signal can be carried out.

The above stated processes are basically similar to the prior techniques as the rotation of the image, in the prior art, each pixel is carried out the process to the bitmap image data having the color data, however in this embodiment according to the present invention, each pixel is carried out to the process to the color selection data signal which includes only the color data selection information from the color data signal.

The replacement of the color selection data signal having a small bit number is easier than the replacement of the data using the bitmap image data. With this reasons, in this embodiment according to the present invention, the circuitry scale can be reduced.

Further, as to the rotation process about the image, in the color selection data signal execution unit 162B, in place of the replacement of the data of the each color which constitutes the color selection data signal, in the extension unit 14B, the call-up order from the image memory 13B of the color selection data signal may be altered according to the rotation information of the image.

As to the enlargement about the image, for example, this enlargement is carried out to insert the data same to the data of the adjacent pixel between the data of each pixel which constitutes the color selection data signal.

Further, as to the reduction about the image, there are methods such as a method for reconstituting the color selection data signal by taking out the data of the pixel corresponding to the reduced each image from the data of each image which constitutes the color selection data signal, and a method for reconstituting the reduced color selection data signal to make possible same to a data distribution on a map in a case where the data of each pixel which constitutes the color selection data signal is developed in the map.

Further, a method for utilizing the dither process etc. may be employed, these processes are basically similar to the techniques which were used the enlargement and the reduction for the image in the prior art.

However, in the prior art against to the bitmap image data in which each pixel has the color data, on the other hand in this embodiment according to the present invention, each pixel is processed against to the color selection data signal which includes the color data selection information from the color data signal.

In this embodiment of the image processing apparatus according to the present invention, the circuitry scale can be reduced because that the bit number is smaller than the case using the bitmap image data.

Figure 23:
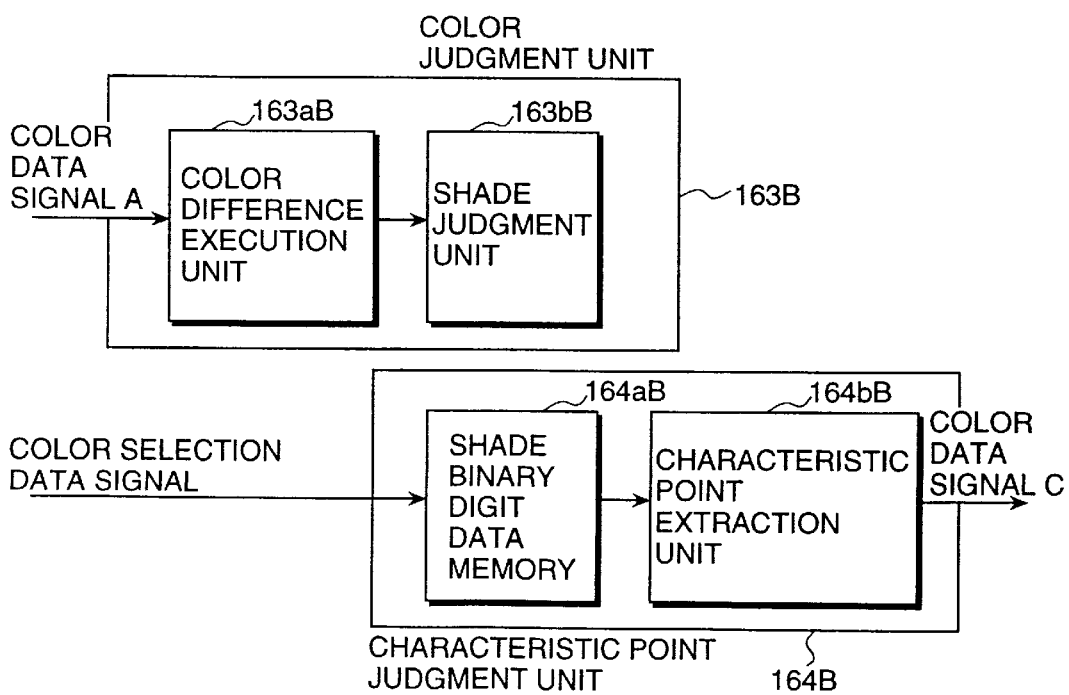
FIG. 23 is a schematic block view showing a color judgment unit 163B and a characteristic point judgment unit 164B shown in FIG. 21.

Next, the color judgment unit 163B will be explained. The color judgment unit 163B judges whether or not the shade exists in the color in a predetermined image area which is specified by a correspondence color data signal by referring to each data included in the color data signal. FIG. 23 is a view a schematic block of the color judgment unit 163B and the characteristic point judgment unit 164B.

As shown in FIG. 23, the color judgment unit 163B has a color difference execution unit 163aB and a shade judgment unit 163bB. The color difference execution unit 163aB executes a color difference between the plural color data included in the color data signal. For example, in a case of the compressed image data shown in FIG. 19, the color difference between the two colors which are the color 0 and the color 1 of the color data signal is executed.

The shade judgment unit 163bB judges the shade of the color under a basis of the color difference which is requested by the color difference execution unit 163aB. Further, as to each of the color data included in the color data signal, the color specified by the correspondence data is transmitted an identification information (a binary digit data) which identifies whether a dense color or a light color to the characteristic point judgment unit 164B.

Next, the characteristic point judgment unit 164B will be explained. The characteristic point judgment unit 164B, as shown in FIG. 23, has a shade binary digit data memory 164aB and a characteristic point extraction unit 164bB. The shade binary digit data memory 164aB stores a shade judgment result (judgment for whether the dense color or the light color) of each color data included in the color data signal.

The characteristic point extraction unit 164bB judges the pixel for becoming the characteristic point according to the search the shade result of the color data (a number for selecting the color data from the color data signal) which corresponds to the data of each pixel which is included in the color selection data signal using the shade binary digit data memory 164aB. In general, the "on edge" extracted as the characteristic point is constituted of the pixel of the light color in comparison with a surrounding portion.

Therefore, the characteristic point extraction unit 164bB obtains the shade result of the pixel for carrying out the judgment of the characteristic point and the shade result of the pixel of the surrounding portion from the shade binary digit data memory 164aB. As a result, it judges whether or not the pixel for carrying the judgment of the characteristic point is the light color in comparison with the pixel of the surrounding portion.

Figure 24:
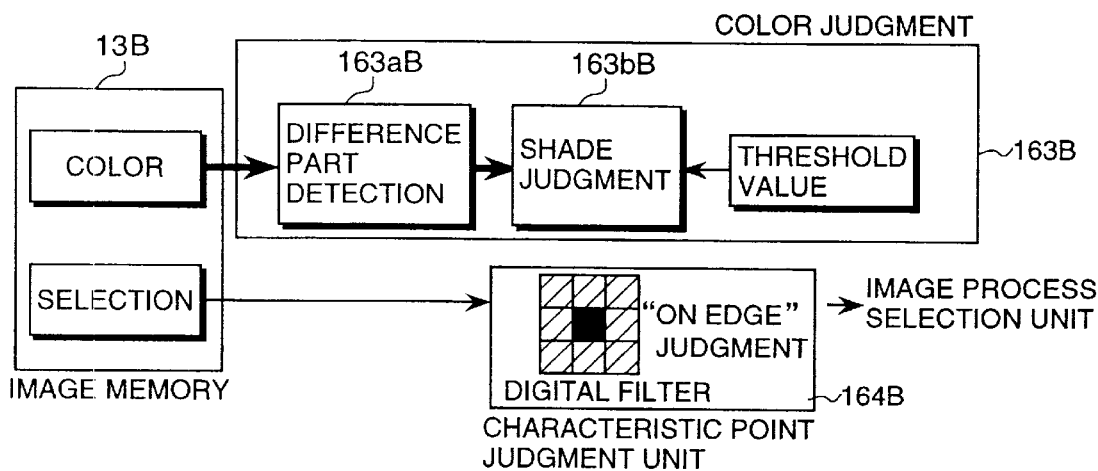
FIG. 24 is a view for explaining a flow of a process in the color judgment unit 163B and the characteristic point judgment unit 164B shown in FIG. 21 in a case where color data included in a color data signal are two.

Herein, the process about the color judgment unit 163B and the characteristic point judgment unit 164B will be explained in detail. First of all, a case where the color data included in the color data signal are two will be explained. FIG. 24 is a view for explaining a flow of the process about the color judgment unit 163B and the characteristic point judgment unit 164B in the case where the color data included in the color data signal are two.

First of all, in the color difference execution process unit 163bB, the color difference between two color data included in the color data signal is executed every color each of R, G, and B (the difference part detection).

Next, in the color difference execution process unit 163bB, with respect to the two color data included in the color data signal, the shade of the color is judged by searching a sign (positive or negative, or plus or minus) of the color difference which is requested by the color difference execution unit 163aB. Further, it judges whether or not an absolute value of the each color difference is larger than a predetermined threshold value (the shade judgment).

Next, in the characteristic point judgment unit 164bB, the data of each pixel included in the color selection data signal (a number for selecting the color data included in the color data signal) is placed to the shade result in the color judgment unit 163B which corresponds to the correspondence data.

Using a digital filter, the extraction of the characteristic point is carried out taking under the considerations of the shade result between the adjacent pixels and the comparison result between the absolute value of the color difference and the threshold value between the correspondence pixels ("on edge" judgment).

Figure 25:
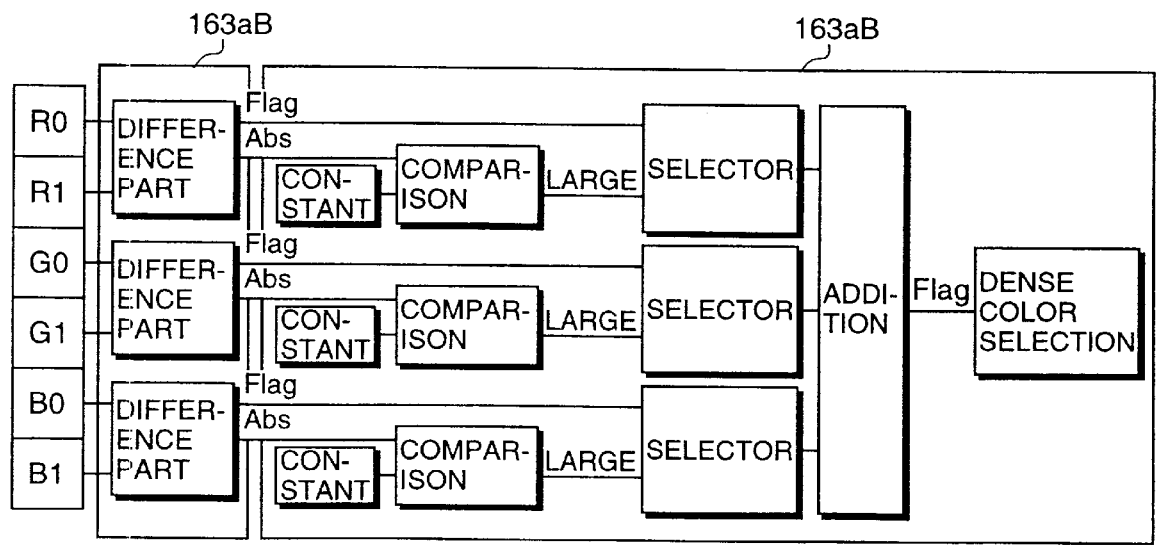
FIG. 25 is a view showing a flow of a detail process according to the color judgment unit 163B shown in FIG. 24.

FIG. 25 is a view showing a detailed process flow of the color judgment unit 163B shown in FIG. 24. In FIG. 25, a respective R0, G0, and B0 shows a data which constitutes one of the color data (the color 0) within two colors included in the color data signal and a respective R1, G1 and B1 shows a data which constitutes another color data (the color 1).

Herein, within each color of R, G, and B for constituting the color data, it will be explained paying an attention to R color. First of all, in the color difference execution unit 163aB, a difference part (R0−R1) between the color 0 and the color 1 is calculated, and a sign of the requested difference part is outputted as a flag which shows whether which is the dense color within the color 0 and the color 1. And then the absolute value of the difference part is outputted.

Next, the shade judgment unit 163bB compares the absolute value of the difference part transmitted from the color difference execution unit 163aB with a predetermined constant (a threshold value).

Further, in a case where the absolute value of the difference part is larger than the constant, the flag outputted from the color difference execution unit 163aB is outputted through the selector and the flag is set as a subject to be added in an addition process stated in a latter portion.

The above stated process is carried out similar to each of G color and B color which constitutes the color data, and a flag which is obtained through the selector is added, and in accordance with the positive (the plus) or the negative (the minus) of the addition result, it judges which of the color 0 and the color 1 is the dense color.

For example, in the color difference execution unit 163aB, with respect to each color of R, G, and B, in a case where the color difference is requested by subtracting the color 1 from the color 0, the addition result is the positive, it judges that the color 0 is the dense color but the addition result is the negative, it judges that the color 1 is the dense color.

Further, in a case where the addition result is zero (0), between the color 0 and the color 1, it judges that it does not exist the shade difference for sufficient to extract the characteristic point.

Figure 26:
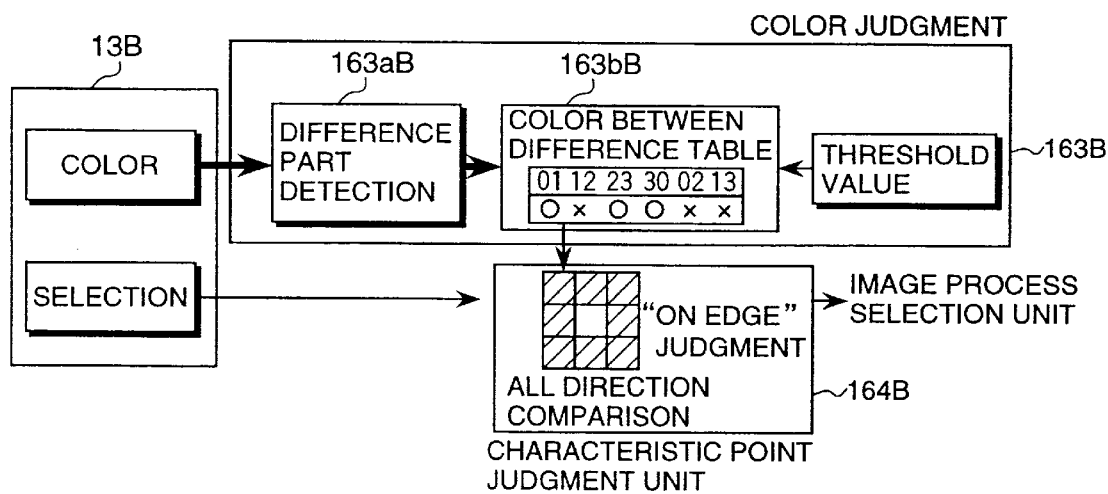
FIG. 26 a view for explaining a flow of a process in the color judgment unit 163B and the characteristic point judgment unit 164B shown in FIG. 21 in a case where color data included in a color data signal are four.

Next, a case where the color data included in the color data signal are more than three will be explained. FIG. 26 is a view for explaining a process flow in the color judgment unit 163bB and the characteristic point judgment unit 164B in the case where the color data included in the color data signal are four.

First of all, in the color difference execution process unit 163aB, with respect to the four color data included in the color data signal, the color difference of the color data in the respective combination of the above stated two colors is executed every color each of R, G, and B (the difference part detection).

Next, in the shade judgment unit 163bB, by searching a sign (positive or negative) of the color difference which is requested by the color difference execution unit 163aB, the respective combination of the above stated two colors (the shade judgment). Next, the shade result of the respective combination of the color data of the above stated two color data is summarized in the color between difference part table.

Next, in the characteristic point judgment unit 164bB, the data of each pixel included in the color selection data signal (a number for selecting the color data included in the color data signal) is developed on the map. By the color between difference part table, the shade result of the adjacent pixels is searched, and using this the characteristic point is carried out the extraction (edge judgment).

Figure 27:
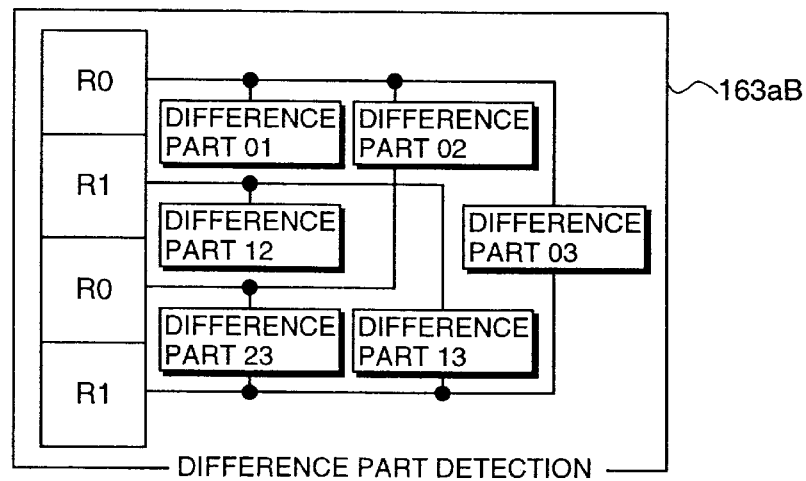
FIG. 27 is a view for explaining a flow of a detail process according to a color difference execution unit 163aB of the color judgment unit 163B shown in FIG. 26.
Figure 28:
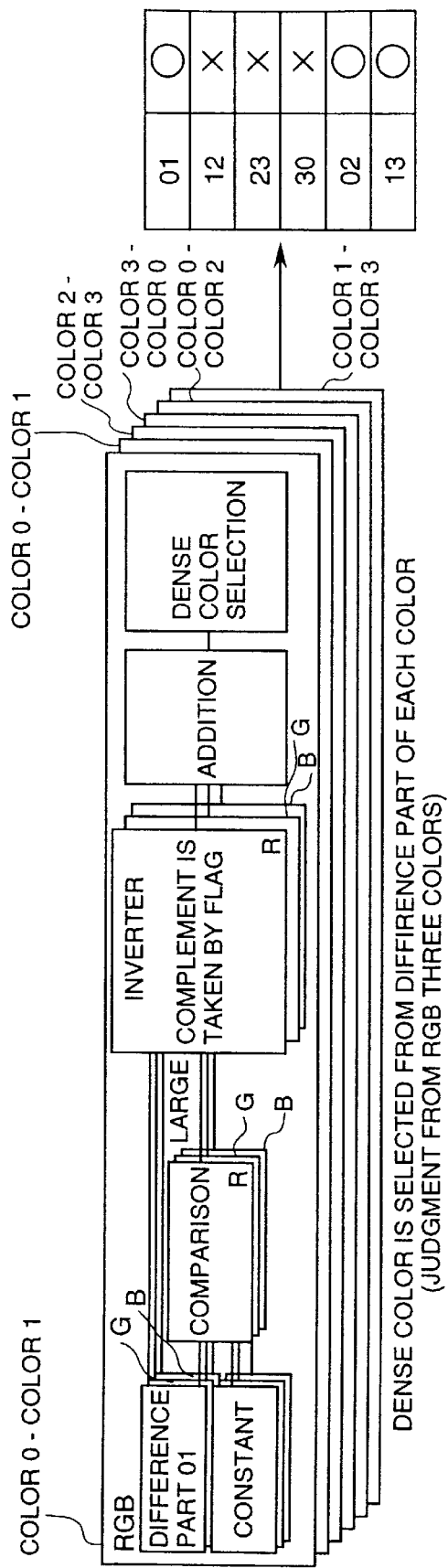
FIG. 28 is a view for explaining a flow of a detail process according to a shade judgment unit 163bB of the color judgment unit 163B shown in FIG. 26.

FIG. 27 and FIG. 28 are views for explaining detailed process flows of the color judgment unit 163B shown in FIG. 26. FIG. 27 is a view showing a process in the color difference execution unit 163aB and FIG. 28 is a view showing a process in the shade judgment 163bB, respectively.

First of all, as shown in FIG. 27, in the color difference execution unit 163aB, with respect to each color of R, G, and B of the four color data, all of difference parts between the respective color data are taken in. Further, in FIG. 27, as to R color (R0, R1, R2, and R3) of the data of the four colors (the color 0, the color 1, the color 2, and the color 3), a case of all of the difference parts between the respective color data is shown, and also G color and B color are processed similarly.

Next, as shown in FIG. 28, in the shade judgment unit 163bB, the shade judgment between the respective color data (between the color 0 and the color 1, between the color 1 and the color 2, between the color 2 and the color 3, between the color 3 and the color 0, between the color 0 and the color 2, and between the color 1 and the color 3) is carried out with the manner shown in FIG. 25 and results of the above are written in to the color between difference part table.

In the color between difference part table as shown in FIG. 28, a numeral of a left column, for example "01" indicates the shade judgment of between the color 0 and the color 1, and a result is written in a right side. For example, in a case where the color 0 is judged denser than the color 1, a right side of a "01" column the judgment result [○] is written in, however a case of the reversal judgment result, the judgment result [x] is written in.

Further, in the above stated case, with respect to the plural color data included in the color data signal, the shade judgment between the respective color data is carried out, however it is possible to request the shade with other methods.

Figure 29:
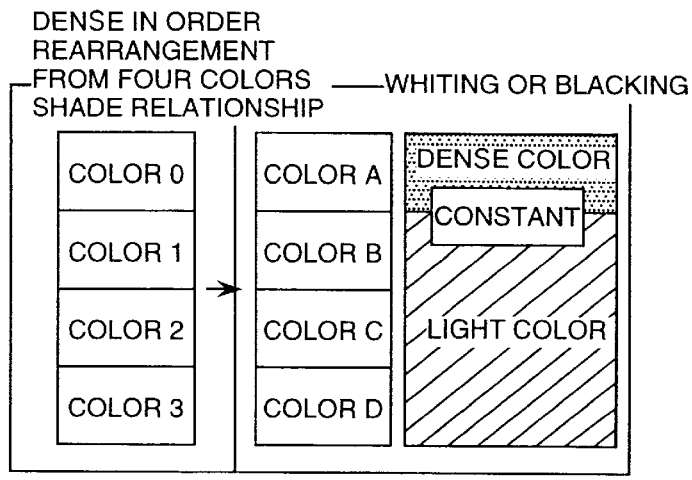
FIG. 29 is a view for explaining another shade judgment method in a case where four color data are included in a color data signal.

FIG. 29 is a view for explaining another shade judgment method in a case where the four color data are included in the color data signal. Herein, the four color data (the color 0–the color 3) included in the color data signal are replaced in order of the dense color. And these color data are divided into two which are comprised of the dense color and the light color.

For example, the dense color threshold value (for example, an average value of the four color data) is set in advance, and making this dense color threshold value as a standard value the four color data are divided into two, which are comprised of the dense color and the light color. Or, in a case where an absolute value of the color difference between the adjacent color data is the maximum value and is more than predetermined value, the four color data are divided into two, which are comprised of the dense color and the light color.

Next, the image process selection unit 165B will be explained. The image process selection unit 165B is carried out to judge the image area under a basis of the judgment result in the characteristic point judgment unit 164B. It is preferable to carry out a different image process with the pixel for forming the characteristic point, the pixel at the surrounding portion, and the pixel remote from the pixel at the surrounding portion, in particularly it is preferable to carry out the halftone process.

For example, in a case where the characteristic point is the "on edge", as to the pixel for forming the characteristic point it is preferable to carry out a line pattern process, as the pixel at the surrounding portion it is preferable to carry out a simple dither process, and in a case where the pixel which is not the pixel for forming the characteristic point is not the pixel at the surrounding portion, it is preferable to carry out a net type dither process.

Further, in a case where the color data included in the color data signal are the colors having clear shade such as the text and the line description etc. each other, to the pixel for forming the characteristic point, it is preferable to carry out a smoothing process.

Accordingly, in the image process selection unit 165B, the image area judgment is carried out under the basis of the judgment result in the characteristic point judgment unit 164B. According to the kinds of the pixels (the pixel for forming the characteristic point, the pixel at the surrounding portion, and the pixel remote from the pixel at the surrounding portion) and the color difference between the color data included in the color data signal, to carry out a proper process, an indication is outputted to the halftone process unit 17B.

Next, the extension unit 14B will be explained. The extension unit 14B generates a continuous tone image data per the pixel unit under basses of the color data signal transmitted from the color data signal execution unit 161B and the color selection data signal transmitted from the color selection data signal execution unit 162B.

First of all, from the color data signal transmitted from the color data signal execution unit 161B, the color data (the continuous tone data) is obtained. And every the obtained color data is given a number in order. Next, from the color selection data signal, the data which is allotted to each pixel in the predetermined image area (a number for selecting the color data from the color data signal) is obtained. And every the pixel each, the data which is allotted to the correspondence pixel is placed to the correspondence color data. Therefore, the continuous tone image data per the pixel unit is generated.

Next, the halftone process unit 17B will be explained. In accordance with the indication from the image process selection unit 165B, the halftone process unit 17B carries out the halftone process such as the net type dither process, the simple dither process, and the line pattern process to the continuous tone image data per the pixel unit which is outputted from the extension unit 14B.

Figure 30:
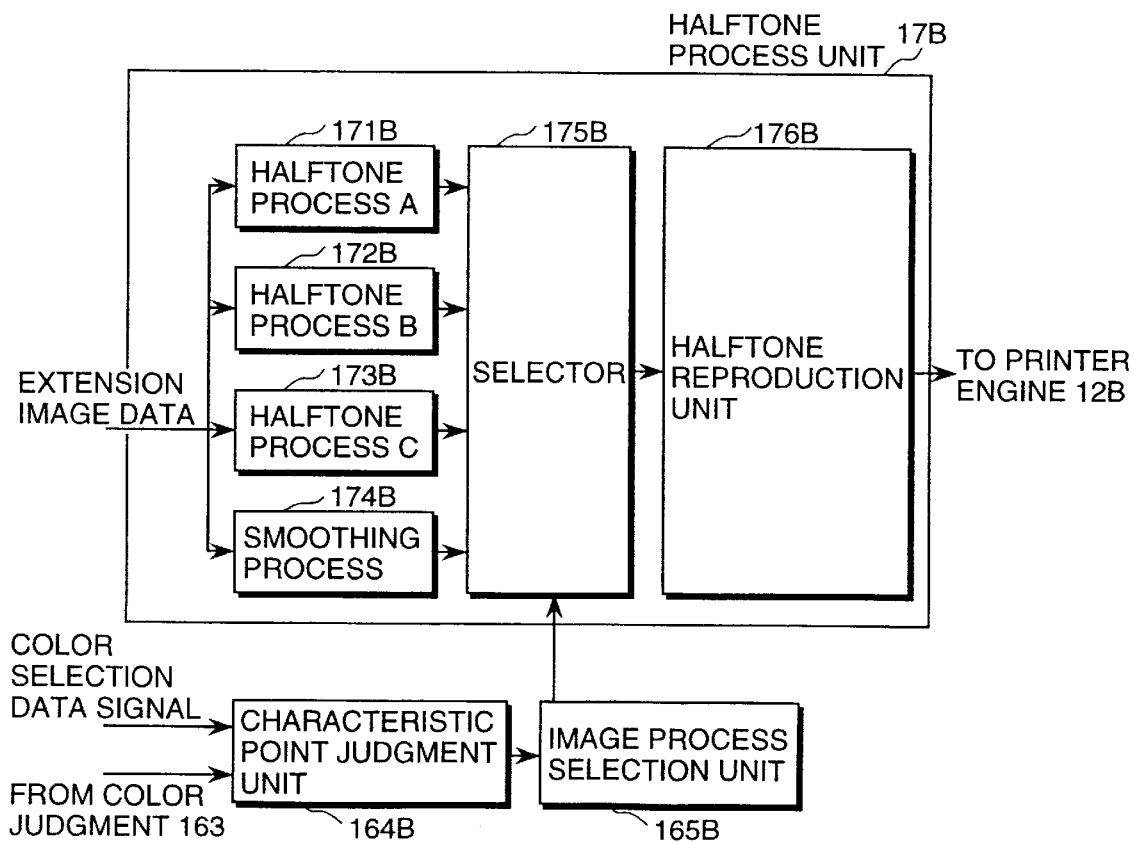
FIG. 30 is a construction block view of an halftone process unit 17B shown in FIG. 21.

FIG. 30 is a view showing a construction block of the halftone process unit 17B shown in FIG. 21. As shown in FIG. 30, the halftone process unit 17B comprises, against to the continuous tone image data per the pixel unit outputted from the extension unit 14B, a halftone process A unit 171B for carrying out the net type dither process, a halftone process B unit 172B for carrying out the simple dither process, a halftone process C unit 173B for carrying out the line pattern process, and a smoothing process unit 174B, a selector 175B for outputting one output from one of the process units 171B–174B in accordance with the indication from the image process selection unit 165B, and a halftone reproduction unit 176B for reproducing the halftone under a basis of the continuous tone image which is received through the selector 175B.

Further, herein, as to the halftone process the process using four processes is explained, however it will be not limited to this number and further the content for carrying out the process will not be limited to this. For example, in the characteristic point judgment unit 164B, in a case where the pixel is judged to belong to which image area of the two areas of the edge portion and the non-edge portion, it requires only two halftone processes.

As stated in the above, in accordance with the judgment of the characteristic point judgment 164B, the image process selection unit 165B indicates to select a suitable process against to the continuous tone image data of the pixel which becomes the judgment to be subjected in the correspondence characteristic point judgment unit 164B.

By receiving the above stated indication, the selector 175B selects one output from the process units 171B–174B as the continuous tone image data of the pixel which becomes to the judgment to be subjected in the characteristic point judgment unit 164B. For example, in a case where the judgment result in the characteristic point judgment unit 164B shows that the pixel for forming the judgment to be subjected is the "on edge", by the selector 175B the halftone process C unit 173B is selected.

With the above stated process, the halftone reproduction unit 176B output a matter in which the line pattern process is performed to the continuous tone image data of the pixel for forming the judgment to be subjected. Further, in a case where the pixel for forming the judgment to be subjected is the surrounding portion of the "on edge", through the selector 175B, the halftone process B unit 172B is selected.

With the above stated process, the halftone reproduction unit 176B output a matter in which the simple dither process is performed to the continuous tone image data of the pixel for forming the judgment to be subjected. Further, in a case where the pixel for forming the judgment to be subjected shows the pixel remote from far way the edge, the halftone process A unit 171B is selected by the selector 175B.

With the above stated process, the halftone reproduction unit 176 output the matter in which the net type dither process is performed to the continuous tone image of the image for forming the judgment to be subjected. Further, the judgment result in the characteristic point judgment 164B is a case where the pixel for forming the judgment to be subjected is edge and also it is the clear dense of the color such as the text and the line description etc., this is judged from the color difference between the color data which is requested by the color judgment unit 163B, the smoothing process unit 174B is selected by the selector 175B.

With the above stated process, the halftone reproduction 176B output the matter in which the smoothing process is performed to the continuous tone image of the image for forming the judgment to be subjected.

The halftone reproduction 176B carries out the reproduction of the halftone under a basis of the continuous tone image data per the pixel unit which is taken in order through the selector 175B. Accordingly, the continuous tone image data per the pixel unit is converted to the outpu t signal suited for the printer engine 12B. For example, in the case of the laser printer, in generally the serial data is outputted to the printer engine.

In the above stated case, the continuous tone image data is converted to the serial data which has the pulse amplitude and the pulse application time according to the tone (the gradation) shown in the correspondence data. Namely, by varying the pulse amplitude an optical amount of the laser light is varied or by varying the pulse application time a luminous time is varied. As a result each pixel of the print image has the tone (the gradation) in response to the continuous tone image data of the correspondence pixel.

Further, in a case where the tone number enable for reproducing the pixel unit of the print image is small, it is possible to use together the halftone reproduction used the space modulation such as the dither which is carried out in the former stage halftone process.

In this embodiment of the image processing apparatus according to the present invention, as stated in the above, the color correction process such as the color conversion process etc. and the pixel rearrangement such as the rotation of the image etc. are carried out against to the compressed image data.

Accordingly, in comparison with the case where the above stated process is carried out to the image after the extension process, namely the continuous tone image data of the pixel unit, the bit number to be treated can be deleted remarkably. As stated in the above, according to this embodiment of the image processing apparatus of the present invention, the memory capacity and the data bass width necessary for the above stated process can be made small. Accordingly, the circuitry scale can be small. Further, the time required to carry out the process can be shortened.

Further, according to this embodiment of the image processing apparatus of the present invention, since the compressed image in which the data length is constant always is used, the motion from the read-out of the compressed image from the image memory 13B to the halftone process in the halftone process unit 17B can be carried out to synchronize in accordance with the requirement timing of the printer engine 12B. As a result, it is unnecessary to provide a buffer for converting the speed.

Further, in the above stated embodiment of the image processing apparatus according to the present invention, the color data signal processed in the color data signal execution unit 161B and the color selection data signal processed in the color selection data signal execution unit 162B are outputted directly to the extension unit 14B.

Figure 31:
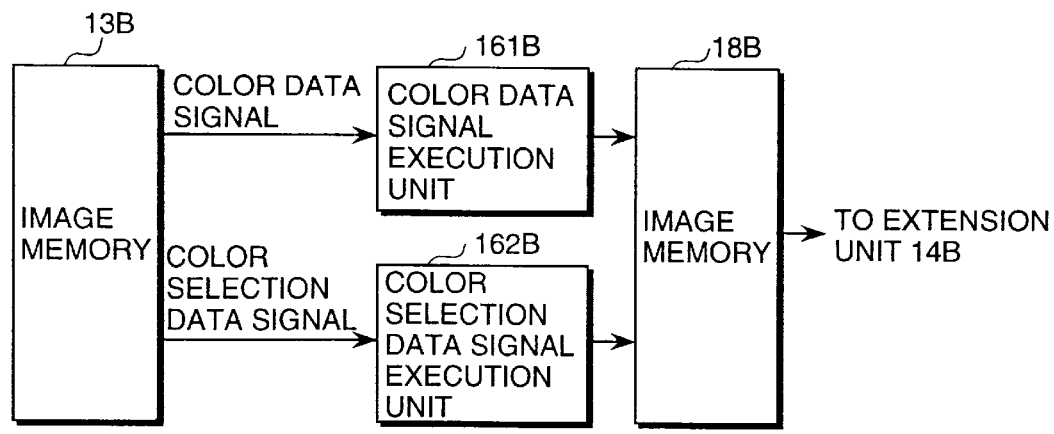
FIG. 31 is a view for explaining a modified embodiment of the first embodiment of the information print system and the image processing apparatus according to the present invention shown in FIG. 18.

However, as shown in FIG. 31, it is possible to store once the color data signal processed in the color data signal execution unit 161B and the color selection data signal processed in the color selection data signal execution unit 162B to the image memory 18B and after that it is possible to output them to the extension unit 14B.

With the above stated construction, the read-out of the color data signal and the color selection data signal which are stored in the image memory 13B is not carry out in order (for example, an input order of the image memory 13B), it can adjust the read-out from the image memory 18B.

With the above stated construction, it is possible to output in order the color data signal and the color selection data signal against to the extension unit 14B, accordingly the process of the color data signal which requires many process time etc. can be practiced in advance.

Further, in the above stated embodiment of the image processing apparatus according to the present invention, the compressed image which is transmitted from the computer 2B is stored once in the image memory 13B and after that the image process is carried out in the image process unit 16B. However, the compressed image which is transmitted from the computer 2B can be inputted directly to the image process unit 16B without through the image memory 13B.

In this embodiment of the image processing apparatus according to the present invention, since the compressed image data having the constant data length is used, without the provision of the image memory 13B, it is possible to carry out smoothly the image process in the image process unit 16B. Further, in the above stated embodiment of the image processing apparatus according to the present invention, as the color data signal of the compressed image data which is transmitted from the computer 2B, the matter including color data comprised of R, G, and B is explained.

However, the color data is not limited to the above stated case, for example, as the color data signal of the compressed image data which is transmitted from the computer 2B, the matter including the color data comprised of Y, M, C, and K can be used, and in this case the color conversion process in the color data signal execution unit 161B becomes unnecessary.

Further, in the above stated embodiment of the image processing apparatus according to the present invention, as the color conversion process in the color data signal execution unit 161B, the color conversion process from the color data comprised of R, G, and B to the color data comprised of Y, M, C, and K is explained. However, the color conversion process in the color data signal execution unit 161B is not limited to the above case, but the color data of the color data signal of the compressed image data which is transmitted from the computer 2B can convert to the color data in response to the characteristic of the printer engine 12B. For example, the color data comprised of R, G, and B can convert to the color data comprised of Y, M, C, and K and an addition of the light magenta and the light cyan.

Figure 32:
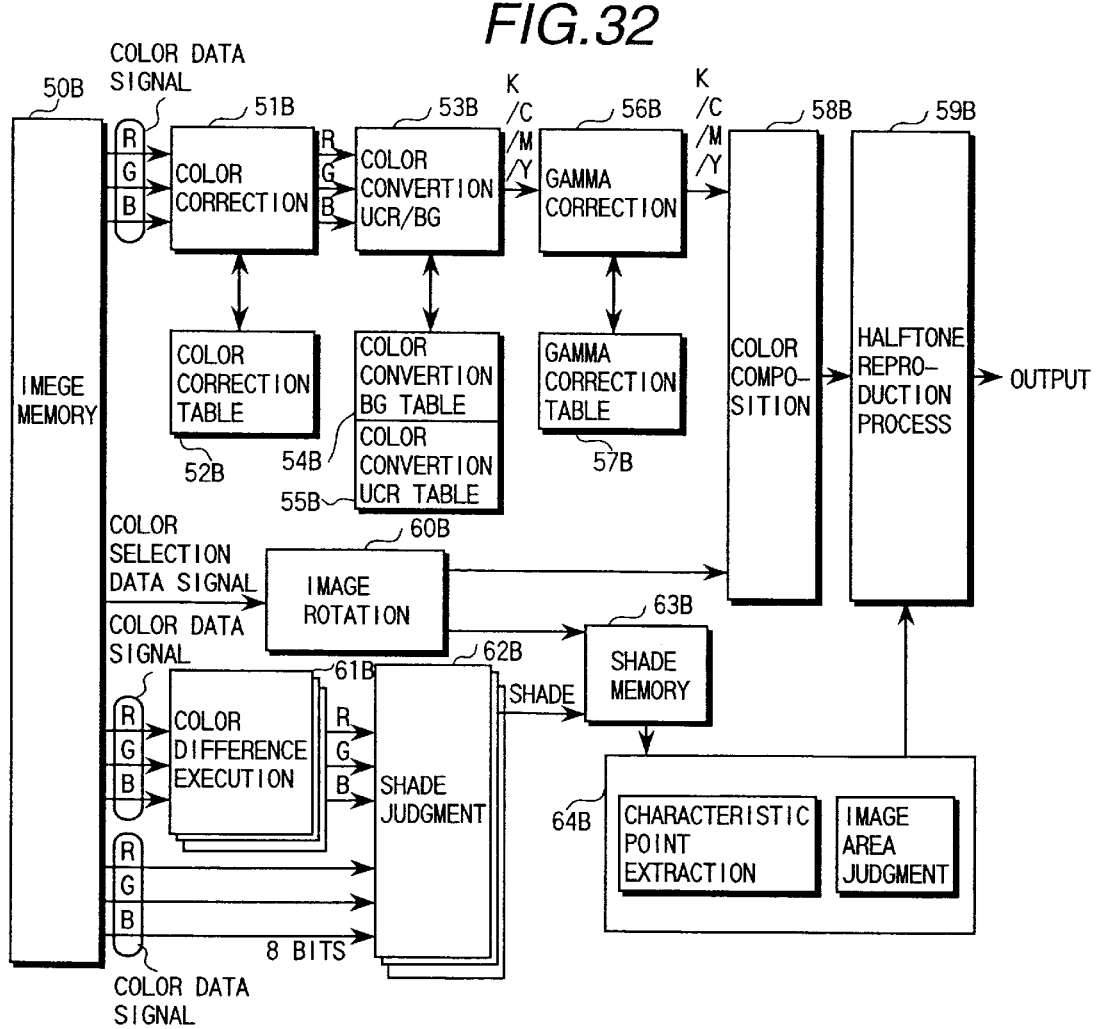
FIG. 32 is a circuitry construction of a print control unit to which the first embodiment of the information print system and the image processing apparatus according to the present invention is applied.

Herein, a concrete circuitry construction example of this embodiment of the image processing apparatus according to the present invention will be explained. FIG. 32 is a view showing a circuitry construction of the print control unit in which the other first embodiment of the information print system and the image processing apparatus according to the present invention is applied.

In FIG. 32, among the compressed image data stored in the image memory 50B, the color data signal comprised of the plural colors which are truncated by the predetermined image area in accordance with the execution using the color space is inputted into a color correction circuit 51B. The color correction circuit 51B carries out the color correction in response to the printer engine 12B referring to the color correction table which is stored in a memory 52B. After that the corrected color data is inputted into a color conversion process circuit 53B.

The color conversion process circuit 53B converts the color data included in the color data signal from data of R, G, and B to the data of Y, M, C, and K referring to a color conversion process UCR table stored in a memory 55B and a color conversion process BG table stored in a memory 54B. After that, the color data of the color data signal is carried out the gamma correction in a gamma correction circuit 56B. Herein, to carry out the halftone reproduction in the printer engine 12B, the gamma correction process is carried out referring to a gamma correction table which is stored in a memory 57B.

On the other hand, among the compressed image data stored in the image memory 50B, at every the above stated predetermined area each, the color selection data signal, in which the number for selecting one color data included the above stated color data signal is described, is inputted into an image rotation circuit 60B and according to demands the rotation process by the rearrangement of the pixel is performed.

As stated in the above, the color data signal which is performed to the color correction and the color selection data signal which is performed to the pixel rearrangement process are inputted into an extension circuit 58B and therein they are extended to the continuous tone image data of the pixel unit. Further, the color data signal stored in the image memory 50B is inputted into a color difference execution circuit 61B and therein the color difference between the plural colors included in the color data signal is calculated every color each of R, G, and B.

A shade judgment circuit 62B judges the shade of the plural colors included in the color data signal under a basis of the result in the color difference execution circuit 61B, and an obtained judgment result is stored in a dense memory 63B. In the shade judgment circuit 62B, the color selection data signal outputted from the image rotation circuit 60B is also stored.

A characteristic point judgment circuit 64B carried out the extraction of the characteristic point and the judgment of the image area under the bases of the shade judgment result of the color date used in the predetermined image area and the selection number of the color data used for each pixel in the predetermined image area which are stored in the shade memory 63B. And in response to the judgment result, an indication is produced to select a suitable halftone process.

A halftone reproduction process circuit 59B carries out in parallel plural halftone processes (the net type dither process, the simple dither process, the line pattern process, etc.) against to the continuous tone image data which is extended in the extension unit 58B. And in accordance with the indication of the characteristic point judgment circuit 64B, a suitable result is selected among the plural halftone process results, and under a basis of the selected result the halftone is reproduced and outputted.

In this other first embodiment of the image processing apparatus according to the present invention stated in above, as the color data signal for the compressed image data, the case in which the matter truncated to the plural colors according to the execution taking consideration into the color space in the predetermined image area is used is explained.

However, it can employ the compressed image data which, every predetermined image area each, comprises of the color data signal including a specific information to specify at least one color for use in an expression about the predetermined image, and as to each pixel in the above stated predetermined image area, the color selection data signal including the selection information to select the above stated specific information among the color data signal.

Hereinafter, as the other second embodiment according to the present invention, a case where the color data signal of the compressed image data is truncated to the color in the predetermined image area with the plural colors using a color pallet table will be explained.

FIG. 33 is a view for explaining a construction example of the compressed image data in a case where the color in the predetermined image area is truncated to the plural colors using the color pallet table. Herein, a reference numeral 22cB donates a data construction of the color data signal, and a reference numeral 22dB donates a color construction of the color selection data signal.

In the example shown in FIG. 33, the color used in the predetermined image area is truncated to two colors comprised of the color 0 and the color 1 using the color pallet table. In concretely, as shown in FIG. 34, the truncated two colors are selected from the color pallet table referring to the color data of each pixel used in the predetermined image area. And the information (a pallet number) to specify the selected two colors is placed in order in a predetermined number and is generated as the color data signal. As shown in FIG. 34, in a case where a number of the colors on the color pallet table are 256 colors, the pallet number can express with 8 bits, the color data signal becomes 16 bits up to total as shown in FIG. 33.

In the color selection data signal, as to each pixel in the above stated predetermined image area, the information (the number) for specifying the pallet number is constituted of arranging in order the pixel. As shown in FIG. 33, in a case where the color data signal is constituted by the color 0 and the color 1, the color selection data signal has 1 bit per one (1) pixel.

As a result, according to the compressed image data shown in FIG. 33, the bitmap image data (each color of R, G, and B of 8 bits, 24 bits per one pixel, up to total 384 bits) having 4×4 pixel can be compressed to the total 32 bits comprised of the color data signal 16 bits and the color selection data signal 16 bits.

Next, a constriction about the other second embodiment of the image processing apparatus according to the present invention will be explained. FIG. 33 is a view showing a construction block of the print control unit 11aB which is an essential unit of this embodiment according to the present invention and other constructions are similar to those of the embodiment shown in FIG. 18.

Figure 35:
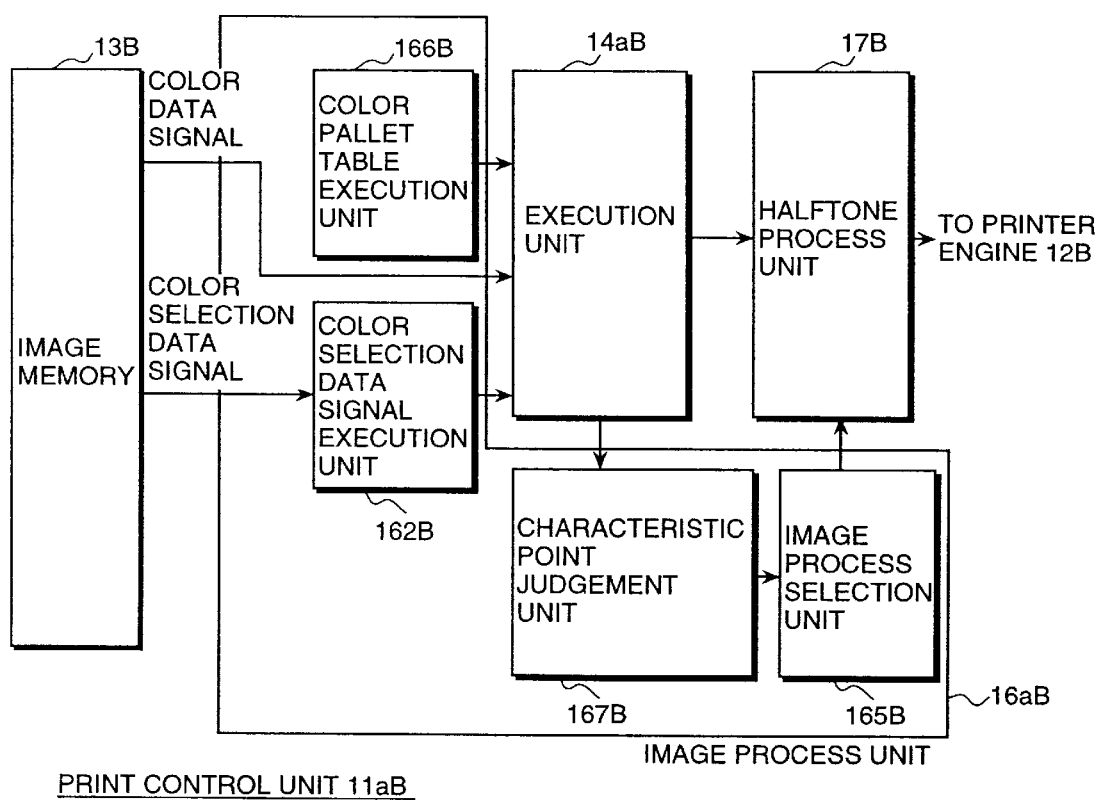
FIG. 35 is a construction block view showing a print control unit 11aB which is an essential unit according to the present invention.

The different elements of the color pallet table execution unit 166B compared with the print control unit 11B shown in FIG. 21 are that, as shown in FIG. 35, in place of the image process unit 16B an image process unit 16aB is used and further in place of the extension unit 14B, an extension unit 14aB is used.

The print control unit 16aB of this other second embodiment according to the present invention has a color pallet table execution unit 166B, a color selection execution unit 162B, an image point judgment unit 167B, and an image process selection unit 165B. Herein, the color pallet table execution unit 166B and the image process selection unit 165B are the same of those used in the first embodiment according to the present invention.

The color pallet table execution unit 166B carries out the color correction process such as the color conversion process from the color of R, G, and B to the color of Y, M, C, and K, the color adjustment and the halftone correction against to the color pallet table (the same table of the color pallet table used in the compression of the image data) which is prepared in advance to the memory.

In the former explained other first embodiment according to the present invention, the color correction process is carried out to the color data signal, however the color data signal used in this embodiment according to the present invention is constituted of a pallet number on the color pallet table.

Namely, differing from the color data signal of the other first embodiment according to the present invention, since the color data signal itself has not a color data, the color correction process does not carry out directly to the color data signal. Herein, in this other second embodiment according to the present invention, the color correction process carries out against to the color pallet table. Further, the contents themselves of the color correction process are basically similar to that of the first embodiment according to the present invention.

The characteristic point judgment unit 167B carries out the characteristic point judgment such as the "on edge" etc. under a basis of the continuous tone image data per the pixel which is extended by an extension unit 14aB stated in a latter portion. This process is basically similar to the "on edge" judgment explained using from FIG. 22 to FIG. 25 which show the prior art techniques.

The extension unit 14aB generates the continuous tone image data per the pixel under the bases of the color data signal transmitted from the image memory 13B, the color selection data signal transmitted from the color selection execution unit 162B, and the color pallet table in which the color correction process is carried out on the color pallet table execution unit 166B.

FIG. 36 is a view showing a construction block of the extension unit 14aB shown in FIG. 35 and a construction example of the extension unit 14aB shown in FIG. 33 in which as the compressed image data two colors pallet number is included in the color data signal. In an example shown in FIG. 36(a), the color data signal transmitted from the image memory 13B and the color selection data signal transmitted from the color selection data signal execution unit 162B are transmitted to a segmentation storing unit 142B through a buffer 141B.

The segmentation storing unit 142B obtains two colors pallet number from the color data signal and stores it in order in a memory 142aB and a memory 142bB. Further, the data of each pixel (a number for selecting the color pallet number from the color data signal) included in the color selection data signal is developed in order the pixel to the bitmap and is stored in a memory 142cB. Next, in a selector 143B, the data of each pixel is read out in order from the memory 142cB and in response to the number shown in the read-out data, the data (the color pallet number) which is stored in which one of the memory 142cB and the memory 142bB is read out.

And in a conversion unit 144B, referring to the color pallet table 144aB in which the color correction process is carried out in a color pallet table execution unit 166B, the color pallet number transmitted from the selector 143B is converted to the correspondence color data, accordingly the compressed image data is extended to the continuous tone image data per the pixel unit.

In an example shown in FIG. 36(b), the color selection data signal transmitted from the color selection data signal execution unit 162B is transmitted to the segmentation storing unit 142B through the buffer 141B and also the color data signal transmitted from the image memory 13B is transmitted to the conversion unit 144B through the buffer 141B.

The conversion unit 144B obtains the color pallet number from the color data signal and, referring to the color pallet table 144aB in which the color correction process is carried out in the color pallet table execution unit 166B, the obtained color pallet number is converted to the color data and the converted color data is transmitted in order to the segmentation storing unit 142B.

The segmentation storing unit 142B obtains the color data which is transmitted from the conversion unit 144B and the obtained color data is stored in order to a memory 142dB and a memory 142eB. Further, the data of each pixel included in the color selection signal which is transmitted from the buffer 141B is developed on the map and is stored in a memory 142cB.

Next, in the selector 143B, the data of each pixel is read out in order from the memory 142cB and, in response to the number shown in the read-out data, the data (the color data) which is stored in which one of the memory 142dB and the memory 142eB is read out. Accordingly, the compressed image data is extended to the continuous tone image data per pixel unit.

According to this other second embodiment of the image processing apparatus of the present invention, the color correction process carries out to the before advanced prepared color pallet table (the same table to the color pallet table used for the compression of the image data) but not to the color data signal which is read out from the image memory 13B. As a result, it is possible to practice in advance the color correction process. Further, in this other second embodiment according to the present invention, similar to that of the first embodiment according to the present invention, since the pixel rearrangement such as the rotation about the image can be carried out directly against to the color selection data signal, the memory capacity necessary for the process can be made small.

Further, in the above stated other second embodiment according to the present invention, the color pallet table (the color pallet table in which each color data included in the table is comprised of R, G, and B) which is used to compress the image data in the computer is prepared in advance at a side of the print control unit and the each color data included in this color pallet table is converted to from the data comprised of R, G, and B to the data comprised of C, N, Y, and K using the color pallet table execution unit 166B.

However, it is not limited to the color pallet table which is prepared in advance at the side of the print control unit. It can prepare in advance at the side of the print control unit the color pallet table in which each color data included in the color pallet table, which is used to compress the image data in the computer, is converted to the color data for responding the characteristic of the printer engine.

For example, it can prepare in advance, the color pallet table at the side of the print control unit, in such a color pallet table, in a case where each of color data included in the color pallet table, which is used in the compression of the image data by the computer, is comprised of R, G, and B, and a color pallet table is one in which the above stated each color is converted to a color conversion of C, M, Y, and K. In the above stated case, the color conversion process in the color pallet table execution unit 166B becomes unnecessary.

In the above stated other first embodiment and the other second embodiment of the image processing apparatus according to the present invention, the case in which the present invention is applied to the printer is explained, however the present invention does not limited to only this case. It is possible to apply the present invention to various output apparatus such as a facsimile equipment and a monitoring apparatus etc.

Figure 37:
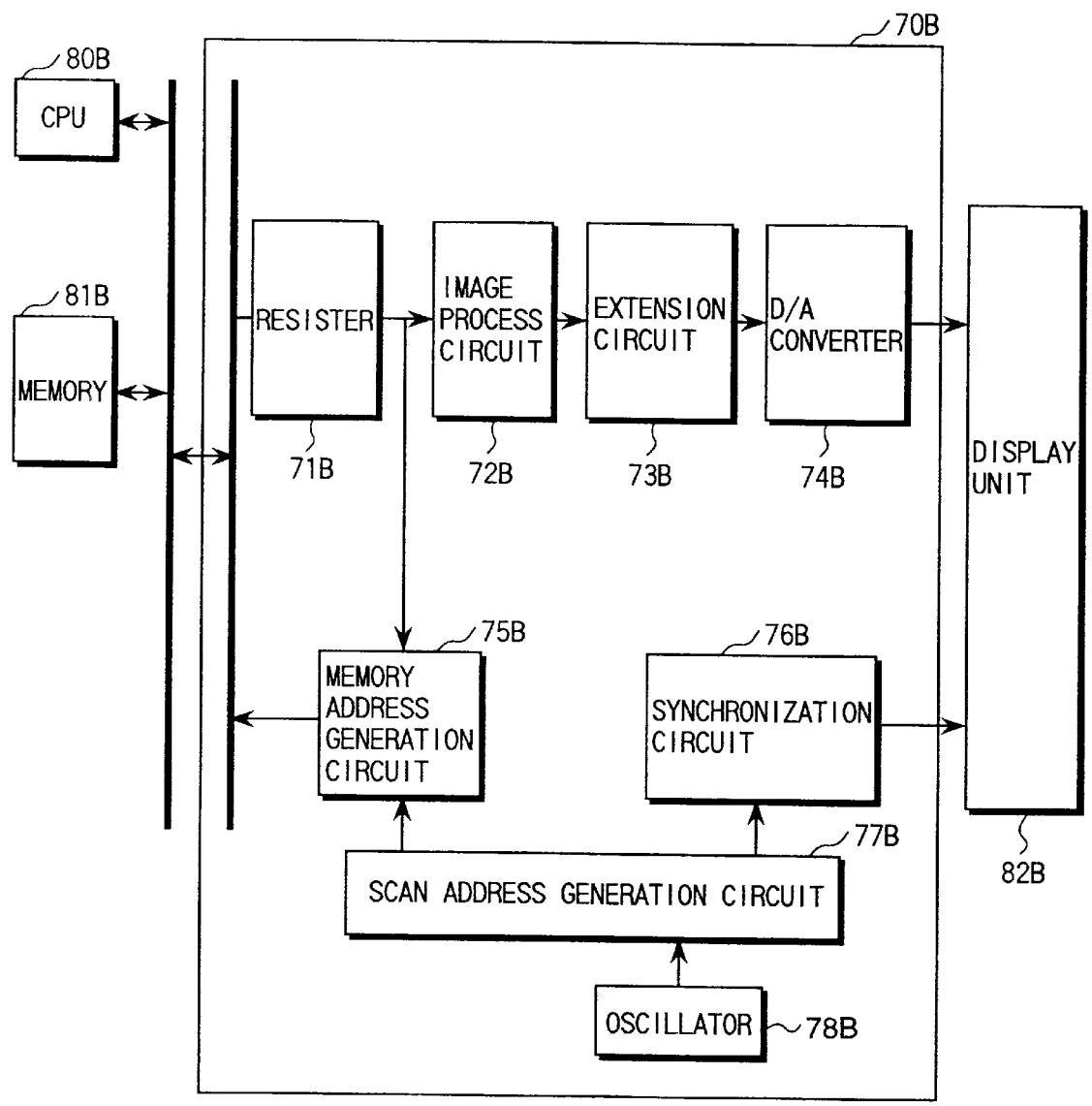
FIG. 37 is a circuitry construction showing a display control unit 70B to which the present invention is applied.

As one example, a case where the present invention is applied to a display control unit will be explained. FIG. 37 is a view showing a circuitry construction of a display control unit 70B to which the present invention is applied. In FIG. 37, a CPU 80B in the computer compresses the continuous tone image data per the pixel unit to the compressed image data comprised of the color data signal and the color selection data signal under the manner stated in each of the above stated embodiments according to the present invention and this compressed image data is stored in a memory 81B.

A memory address generation circuit 75B generates an address of a data to be read out from the memory 81B in a scan address generation circuit 77B in accordance with a scan address which is generated under a basis of a clock signal which is outputted from an oscillator 78B. Receiving this, a compressed image data is read out from the memory 81B. The compressed image read out in order from the memory 81B is inputted into an image process circuit 72B through a resister 71B.

And in a case where the color data signal of the compressed image data is constituted of the color data of the plural colors which is truncated by the execution using the color space, with the manner explained in the other first embodiment according to the present invention, the color correction process is carried out to the color data signal but the color conversion process from the color of R, G, and B to the color of Y, M, C, and K is not carried out.

Further, against to the color selection data signal of the compressed image data, the image process circuit 72B carries out the process accompanying with the pixel rearrangement such as the rotation, the enlargement and the reduction about the image is carried out according to demands. The color data signal and the color selection data signal outputted from the image process circuit 72B are extended to the continuous tone image data per the pixel unit in an extension circuit 73B with the manner explained in each above stated embodiment according to the present invention and after that then extended continuous tone image is converter to an analog signal in a D/A converter.

And in a synchronization circuit 76B, the signal is outputted to a display unit 82B in accompany with a synchronization signal which is generated under a basis of the scan address generated in the scan address generation circuit 77B.

As stated in the above, according to this embodiment of the present invention, the memory capacity necessary for the image process can be reduced, and the bass width for transmitting the image can be made small and further the circuitry scale can be made small.

What is claimed is:

1. In an information print system having information process equipment for treating information, including text and graphics, and print equipment connected to said information process equipment, the information print system comprising:

print image description means in said information equipment for developing and describing print data for a print image and a compression means in said information equipment for compressing said described print image data, and extension means in said print equipment for extending said compressed print image data and correction means in said print equipment for correcting said print image data to be suitable to a printing characteristic of said print equipment, further including plural first halftoning means and an image segmentation means for selecting suitable data among data which are tone processed through said plural first halftoning means.

2. An image processing apparatus which comprises:

image processing means for carrying out an image process on compressed image data, for each of a plurality of predetermined image areas, said image processing means being responsive to a color data signal including a specific information for specifying at least one color which is used to express said predetermined image and a color selection data signal including selection information for selecting said specific information among said color data signal as to each pixel in a predetermined image area, and extension means for extending to a continuous tone image data per said pixel unit by adding color data, which is specified by said specific information included in said color data signal of said compressed image data which is selected by selection data, in accordance with said selection data of each pixel in a predetermined image area which is included in a color selection data signal of said compressed image data.

3. An image processing apparatus according to claim 2, the image processing apparatus characterized in that, said image processing means carries out in parallel a process for carrying out said color data signal and a process for carrying out said color selection data signal.

4. An image processing apparatus according to claim 2, the image processing apparatus characterized in that, said image processing means has a color selection data signal process means which carries out a rotation of said image or an enlargement of said image and a reduction of said image by altering an arrangement of said selection information of each pixel included in said color selection data signal.

5. An image processing apparatus according to claim 2, the image processing apparatus characterized in that, said color data signal has color data as said specific information, and said image processing means has color data signal process means for carrying out a color correction process on said color data included in said color data signal.

6. An image processing apparatus according to claim 2, the image processing apparatus characterized in that, said color data signal indicates a color pallet number for specifying said color data from a color pallet table which has plural color data as said specific information, and said image processing means has a color pallet table process means for carrying out a color correction process on said color data included in said color pallet table.

7. An image processing apparatus according to claim 5 or claim 6, wherein, said color correction process is a color conversion process.

8. An image processing apparatus according to claim 5 or claim 6, wherein, said color correction process is a gamma correction process.

9. An image processing apparatus according to claim 2, which further comprises a characteristic point judgment means for judging a characteristic of a corresponding pixel to be processed by searching a shade of the color of the pixel to be processed and a pixel which exists at a surrounding portion of said corresponding pixel on the basis of continuous tone image data per pixel unit which is extended by said extension means, and a halftone process means for outputting said extended continuous tone image data provided by said extension means, on which is performed a halftone process in response to a judgment result of said characteristic point judgment means.

10. An image processing apparatus according to claim 2, wherein said color data signal has color data as said specific information, and the apparatus further comprises characteristic point judgment means for judging a characteristic of a corresponding pixel to be processed by searching a shade of the color of the subject pixel and a pixel which exists at a surrounding portion of said corresponding pixel on the basis of color data included in said color data signal and a continuous tone image data per pixel unit which is extended by said extension means, and a halftone process means for outputting said extended continuous tone image data provided by said extension means, on which is performed a halftone process in response to a judgment result of said characteristic point judgment means.

11. An image processing apparatus according to claim 9 or claim 10, further comprising, halftone reproduction means having at least two halftone process means for carrying out a different halftone process on said continuous tone image data per pixel which is extended by said extension means, and a selector for selecting one among said at least two halftone process means in response to a judgment result of said characteristic point judgment means.

12. An image processing apparatus according to claim 11, wherein said characteristic point judgment means judges, in a case where said pixel to be processed is denser than a pixel which exists in a surrounding portion of said corresponding pixel, as a characteristic point of said corresponding pixel, and said selector changes over said halftone process means for selecting in response to whether said pixel to be processed is judged as said characteristic point or not.

13. An image processing apparatus according to claim 12, wherein one of said at least two halftone process means is a smoothing process means, and said selector selects said continuous tone image data of said corresponding pixel which is subjected to a smoothing process by said smoothing process means.

14. A printer comprising an image formation unit for forming a print image and an image process unit for outputting a signal for forming said print image to said image formation unit, wherein said image formation unit comprises:

storing means for storing compressed image data which comprises, for each one of a plurality of predetermined image areas, a color data signal including specific information for specifying at least one color for use to express said predetermined image area, with respect to each pixel in said predetermined image area, and a color selection data signal including selection information for selecting said specific information among said color data signals;

image processing means for carrying out an image process by reading out said compressed image data stored in said storing means;

extension means for extending said compressed image data, on which is performed said image process by said image processing means, to continuous tone image data, by adding color data specified as specific information included in said color data signal of said compressed image data which is selected by said selection information for every image in accordance with selection information of each pixel in said predetermined image area included in said color selection data signal of said compressed image data; and outputting means for outputting a signal for forming said print image to said image formation unit according to continuous tone image data which is extended by said extension means.

15. A printer according to claim 14, characterized in that, said image processing means has a color selection data signal process means which carries out a rotation of said image or an enlargement of said image and a reduction of said image by altering an arrangement of said selection information of each pixel included in said color selection data signal.

16. A printer according to claim 14, characterized in that, said color data signal has color data comprised of R, G, and B data as said specific information, and said image processing means has color conversion process means for converting said color data included in said color data signal from said R, G, and B data to Y, M, C, and K data.

17. A printer according to claim 14, characterized in that, said color data signal has color data as said specific information, and said image processing means has gamma correction means for carrying out a gamma correction of said color data included in said color data signal suit to a characteristic of said image formation unit.

18. A printer according to claim 14, further comprising characteristic point judgment means for judging a characteristic of a corresponding pixel to be processed by determining the density of the color of a pixel to be processed and a pixel which exists at a surrounding portion of said pixel to be processed on the basis of continuous tone image data per pixel unit which is extended by said extension means, and a halftone process means for outputting said extended continuous tone image data provided by said extension means, on which is performed a halftone process in response to a judgment result of said characteristic point judgment means.

19. An image processing method for extending and outputting compressed image data, the image processing method is characterized in that, previous to an extension process of said compressed image data, an image processing is carried on said compressed image data, wherein said compressed image data comprises, for each of a plurality of predetermined image areas, a color data signal including specific information for specifying at least one color which is used to express said predetermined image and a color selection data signal including selection information for selecting said specific information among said color data signal as to each pixel in said predetermined image area, comprising the step of:

extending compressed image data by an image processing to form continuous tone image data per said pixel unit, including adding color data which is specified by specific information included in said color data signal of said compressed image data, which is selected by selection data in accordance with said selection data of each pixel in a predetermined image area included in a color selection data signal of said compression image data.

20. In an information print system having information process equipment for treating information, including text and graphics, and print equipment connected to said information process equipment, the information print system comprising:

in said information process equipment, means for developing and describing print data to form a print image and fixed rate compression means for compressing said described print image data, and in said print equipment, fixed rate extension means for extending said compressed print image data and correction means for correcting said extended print image data to be suitable to a printing characteristic of said print equipment, further including plural first halftoning means and an image segmentation means for selecting suitable data among data which are tone processed through said plural first halftoning means.

21. In an information print system having information process equipment for treating information, including text and graphics, and print equipment connected to said information process equipment, the information print system comprising:

in said information process equipment, means for developing and describing print data to form a print image and variable rate compression means for compressing said described print image data, and in said print equipment, variable rate extension means for extending said compressed print image data and to correct said extended print image data to be suitable to a printing characteristic of said print equipment, further including plural first halftoning means and an image segmentation means for selecting suitable data among data which are tone processed through said plural first halftoning means.

22. An information print system according to one of claims 1, 20 and 21, further including tone expression means, and second halftoning means which differs from said first halftoning means.

* * * * *